United States Patent
Schwarte et al.

(10) Patent No.: US 6,852,824 B2
(45) Date of Patent: Feb. 8, 2005

(54) POLYURETHANES AND GRAFT COPOLYMERS BASED ON POLYURETHANE, AND THEIR USE FOR PRODUCING COATING MATERIALS, ADHESIVES, AND SEALING COMPOUNDS

(75) Inventors: Stephan Schwarte, Emsdetten (DE); Egon Wegner, Veitshöchheim (DE)

(73) Assignee: BASF Coatings AG, Munster (DE)

( * ) Notice: Subject to any disclaimer, the term of this patent is extended or adjusted under 35 U.S.C. 154(b) by 0 days.

(21) Appl. No.: 10/343,262

(22) PCT Filed: Aug. 13, 2001

(86) PCT No.: PCT/EP01/09327
§ 371 (c)(1),
(2), (4) Date: Jan. 27, 2003

(87) PCT Pub. No.: WO02/14394
PCT Pub. Date: Feb. 21, 2002

(65) Prior Publication Data
US 2004/0102595 A1 May 27, 2004

(30) Foreign Application Priority Data
Aug. 11, 2000 (DE) .......................................... 100 39 262

(51) Int. Cl.$^7$ ............................................. C08G 18/62
(52) U.S. Cl. .......................... 528/75; 525/63; 525/440; 525/455; 525/902; 523/201; 523/501; 526/301; 522/90; 522/96; 522/98
(58) Field of Search ............................... 528/75; 525/63, 525/440, 455, 902; 523/201, 501; 526/301; 522/90, 96, 98

(56) References Cited

U.S. PATENT DOCUMENTS

| 5,691,425 A | 11/1997 | Klein et al. .................. 525/455 |
| 6,001,915 A | 12/1999 | Schwarte et al. ............ 524/457 |
| 6,162,506 A | 12/2000 | Lettmann et al. ......... 427/407.1 |
| 6,372,875 B1 | 4/2002 | Mayer et al. .................. 528/60 |

FOREIGN PATENT DOCUMENTS

| CA | 2073115 | 8/2002 | ......... C09D/175/14 |
| DE | 4437535 | 4/1996 | ......... C08F/283/00 |
| DE | 19645761 | 5/1998 | ......... C08F/283/00 |
| DE | 19722862 | 1/1999 | ......... C09D/151/08 |
| DE | 19736535 | 1/1999 | ......... C09D/151/08 |
| DE | 19953445 | 5/2001 | ........... C08G/18/67 |
| DE | 19953446 | 5/2001 | ........... C08G/18/67 |
| DE | 19948004 | 7/2001 | ........... C08G/18/67 |
| EP | 401 565 | 5/1990 | ............. C09D/5/02 |
| EP | 522 419 | 6/1992 | ........... C08G/18/67 |
| EP | 522 420 | 6/1992 | ............... C08J/3/03 |
| EP | 0 608 021 | 1/1994 | ......... C09D/151/08 |
| EP | 708 788 | 6/1994 | ........... C08G/18/08 |
| EP | 755 946 | 7/1996 | ............. C08F/2/22 |
| EP | 0 807 647 | 4/1997 | ........... C08G/18/08 |
| JP | 61195104 | * 8/1986 | |
| WO | WO 95/14721 | 6/1995 | ......... C08F/290/14 |
| WO | WO 98/54266 | 12/1998 | ......... C09D/151/08 |
| WO | WO01/32666 | 5/2001 | ........... C07F/9/141 |

* cited by examiner

Primary Examiner—Rachel Gorr

(57) ABSTRACT

A hydrophilic or hydrophobic polyurethane having at least one olefinically unsaturated group selected from the group consisting of pendant olefinically unsaturated groups, terminal olefinically unsaturated groups, and mixtures thereo wherein the pendant olefinically unsaturated groups are sele consisting of pendant olefinically unsaturated groups which are attached to a cycloaliphatic group which represents a link in the polymer main chain and pendant olefinically unsaturated groups which are present as a double bond in a cycloolefinic group which constitutes a link in the polymer main chain, and the terminal olefinically unsaturated groups are selected from the group consisting of terminal olefinically unsaturated groups which are attached to a cycloaliphatic group which forms an endgroup of the polymer main chain and terminal olefinically unsaturated groups which are present as a double bond in a cycloolefinic structure which forms en endgroup of the polymer main chain.

20 Claims, No Drawings

POLYURETHANES AND GRAFT COPOLYMERS BASED ON POLYURETHANE, AND THEIR USE FOR PRODUCING COATING MATERIALS, ADHESIVES, AND SEALING COMPOUNDS

The present invention relates to novel polyurethanes and to novel polyurethane-based graft copolymers. The present invention further relates to novel processes for preparing polyurethanes and polyurethane-based graft copolymers. The present invention further relates to the use of the novel polyurethanes and of the novel polyurethane-based graft copolymers to prepare coating materials, adhesives, and sealing compounds. Furthermore, the present invention relates to novel coating materials, adhesives, and sealing compounds, especially aqueous coating materials, adhesives, and sealing compounds. The present invention relates not least to novel coats, adhesive films, and seals obtainable from the novel, especially aqueous, coating materials, adhesives, and sealing compounds. In particular the present invention relates to single-coat or multicoat decorative and/or protective coating systems, especially multicoat color and/or effect coating systems.

Polyurethane-based graft copolymers are known. They are normally prepared by the graft copolymerization of olefinically unsaturated monomers in the aqueous dispersion of a hydrophilic or hydrophobic polyurethane whose polymer chain includes terminal and/or lateral, olefinically unsaturated groups. Groups of this kind may be incorporated

- into the polyurethane chain by way of maleic acid or fumaric acid and/or their esters,
- laterally to the polyurethane chain by way of compounds having two isocyanate-reactive groups and at least one olefinically unsaturated group or by way of compounds having two isocyanate groups and at least one olefinically unsaturated group, terminally to the polyurethane chain by way of compounds having one isocyanate-reactive group and at least one olefinically unsaturated group or by way of compounds having one isocyanate group and at least one olefinically unsaturated group, or
- by way of anhydrides of alpha,beta-unsaturated carboxylic acids.

By way of example, reference is made to patent applications and patents DE 197 22 862 C2, DE 196 45 761 A1, EP 0 401 565 A1, EP 0 522 420 A1, EP 0 522 419 A2, EP 0 755 946 A1, EP 0 608 021 A1, EP 0 708 788 A1 or EP 0 730 613 A1, and also German Patent Applications DE 199 53 446.2 or DE 199 53 203.6, unpublished at the priority date of the present specification.

Moreover, German Patent Applications DE 199 48 004.4-44, unpublished at the priority date of the present specification, describes externally crosslinking polyurethanes containing pendant, i.e., lateral, ethenylarylene groups as grafting sites, and the corresponding externally crosslinking graft copolymers.

Furthermore, German Patent Application DE 199 53 445.4-44, unpublished at the priority date of the present specification, describes the corresponding self-crosslinking polyurethanes and their self-crosslinking graft copolymers.

In the context of the present invention, the property of hydrophilicity denotes the constitutional property of a molecule or functional group to penetrate into the aqueous phase or to remain therein. Accordingly, in the context of the present invention, the property of hydrophobicity denotes the constitutional property of a molecule or functional group to behave exophilically with respect to water, i.e., to tend not to penetrate into water or to tend to depart the aqueous phase. For further details, reference is made to Römpp Lexikon Lacke und Druckfarben, Georg Thieme Verlag, Stuttgart, N.Y., 1998, "Hydrophilicity", "Hydrophobicity", pages 294 and 295.

In the context of the present invention, the term "self-crosslinking" denotes the capacity of a binder to enter into crosslinking reactions of itself. A prerequisite for this is the presence in the polyurethanes and the graft copolymers of complementary reactive functional groups which react with one another and so lead to crosslinking. Alternatively, the polyurethanes and graft copolymers contain reactive functional groups which react "with themselves". The term externally crosslinking, on the other hand, is used to refer to those polyurethanes and graft copolymers in which one variety of the complementary reactive functional groups is present in the polyurethanes and graft copolymers and the other variety is present in a hardener, curing agent or crosslinking agent. For further details, reference is made to Römpp Lexikon Lacke und Druckfarben, Georg Thieme Verlag, Stuttgart, N.Y., 1998, "Curing", pages 274 to 276, especially page 275, bottom.

The known polyurethane-based graft copolymers are used especially for the preparation of waterborne coating materials. The known waterborne coating materials serve primarily to produce color and/or effect basecoats in multicoat coating systems by the wet-on-wet technique, as are described, for example, in the patents and patent applications recited above.

Nevertheless, the preparation of the known polyurethane-based graft copolymers may cause problems.

For instance, lateral and/or terminal allyl groups are often incorporated as grafting centers. However, the reactivity of the allyl groups is comparatively low. If the more reactive acrylate or methacrylate groups are used instead, gelling of the polyurethanes may occur before or during the graft copolymerization.

In some cases it is possible, not least, for the amount of olefinically unsaturated groups in the polyurethanes to prove too low for complete grafting, with the consequence that a large proportion of the monomers intended for grafting on forms separate homopolymers and/or copolymers alongside the polyurethane, which may adversely affect the performance properties of the graft copolymers and of the coating materials, adhesives, and sealing compounds prepared with them. This disadvantage cannot be easily eliminated by raising the double-bond fraction in the polyurethanes to be grafted, since to do so is detrimental to other important performance properties of the polyurethanes.

For instance, in the case of overcoating with powder slurry clearcoats, the clearcoat may crack during baking and/or may undergo delamination, especially after the water jet test. Moreover, popping marks may appear.

It is an object of the present invention to provide new hydrophilic and hydrophobic olefinically unsaturated polyurethanes which have not only terminal but also pendant olefinically unsaturated groups, which may be prepared simply and purposively without the risk of product damage, and which constitute excellent grafting bases for olefinically unsaturated monomers.

A further object of the present invention is to find a new process for preparing olefinically unsaturated polyurethanes which simply, purposively and without the risk of product damage provides hydrophilic or hydrophobic polyurethanes having pendant and/or terminal olefinically unsaturated groups.

Another object of the present invention is to find new graft copolymers in the form of primary dispersions or secondary dispersions which may be prepared simply, purposively and without the risk of product damage.

The novel graft copolymers should be physically curing, thermally self-crosslinking or externally crosslinking, or curable thermally and with actinic radiation (dual cure).

In the context of the present invention, the term "physical curing" means the curing of a polyurethane or of a graft copolymer by filming, linking taking place within a coating by way of formation of loops of the polymer molecules of the binders (regarding the term cf. Römpp Lexikon Lacke und Druckfarben, Georg Thieme Verlag, Stuttgart, N.Y., 1998, "Binders", pages 73 and 74). Alternatively, filming takes place by the coalescence of polymer particles (cf. Römpp Lexikon Lacke und Druckfarben, Georg Thieme Verlag, Stuttgart, N.Y., 1998, "Curing", pages 274 and 275). Normally, no crosslinking agents are required for this purpose. If desired, physical curing may be assisted by atmospheric oxygen, heat, or exposure to actinic radiation.

In the context of the present invention, actinic radiation is electromagnetic radiation, such as visible light, UV radiation or X-radiation, especially UV radiation, and corpuscular radiation such as electron beams.

Yet another object of the present invention is to provide new aqueous and nonaqueous, physically curing, thermally self-crosslinking or externally crosslinking, or heat- and actinic-curing, polyurethane-based coating materials, adhesives and sealing compounds having very good performance properties. In particular the intention is to provide new coating materials, especially new aqueous coating materials, specifically new aqueous basecoats, from which the disadvantages of the prior art are now absent and which instead are outstandingly suitable for application by the wet-on-wet technique. In this context, even with the use of powder clearcoat slurries, there should be no cracking (mudcracking) in the clearcoats, delamination of the clearcoats after the water jet test, or popping marks or pinholes. The new coating materials should possess very good storage stability, outstanding application properties, such as very good leveling and very little tendency to run, even at high coat thicknesses, an outstanding overall visual appearance, and high chemical resistance and weathering stability. Moreover, the new coating materials, adhesives and sealing compounds should have these advantageous properties both as one-component systems and as two-component or multicomponent systems.

In the context of the present invention, two-component or multicomponent systems are coating materials, adhesives and sealing compounds whose crosslinking agent, owing to its high reactivity, has to be stored separately from other constituents of the coating materials, adhesives and sealing compounds prior to application.

Accordingly, we have found the novel hydrophilic or hydrophobic polyurethane having at least one pendant and/or at least one terminal olefinically unsaturated group, in which
1. the pendant olefinically unsaturated group
   1.1 is attached to a cycloaliphatic group which represents a link in the polymer main chain, or
   1.2 is present as a double bond in a cycloolefinic structure which represents a link in the polymer main chain, and
2. the terminal olefinically unsaturated group
   2.1 is attached to a cycloaliphatic group which forms an end group of the polymer main chain, or
   2.2 is present as a double bond in a cycloolefinic structure which forms an end group of the polymer main chain.

In the text below, the novel hydrophilic or hydrophobic polyurethane having at least one pendant and/or at least one terminal olefinically unsaturated group is referred to as the "polyurethane of the invention".

We have further found the novel graft copolymer preparable by (co)polymerizing at least one olefinically unsaturated monomer in the presence of the polyurethane of the invention.

In the text below, the novel graft copolymer based on the polyurethane of the invention is referred to as the "graft copolymer of the invention".

We have additionally found the novel adhesives, sealing compounds and coating materials, in particular coating materials, especially aqueous coating materials, specifically aqueous basecoats, which comprise at least one polyurethane of the invention and/or at least one graft copolymer of the invention and which are referred to below as adhesives, sealing compounds and coating materials of the invention.

Further subjects of the invention will emerge from the description.

In the light of the prior art it was surprising, and unforeseeable for the skilled worker, that the complex problem on which the present invention was based, could be solved with the aid of the polyurethanes of the invention and/or of the graft copolymers of the invention. A particular surprise was that the polyurethanes of the invention and the graft copolymers of the invention can be prepared simply and purposively without damage to the products of the invention. A further surprise was the extremely broad usefulness of the polyurethanes of the invention and of the graft copolymers of the invention. It was totally unforeseeable that the graft copolymers of the invention, in particular, give aqueous basecoats which may be processed together with powder clearcoat slurries by the wet-on-wet technique to form outstanding multicoat color and/or effect coating systems without any cracking (mudcracking) in the clearcoats, delamination of the clearcoats after the water jet test, or popping marks or pinholes.

The polyurethane of the invention comprises at least one pendant and/or at least one terminal olefinically unsaturated group. Alternatively expressed, the polyurethane of the invention comprises at least one pendant, at least one terminal, or at least one pendant and at least one terminal olefinically unsaturated group. In this context, the polyurethanes of the invention which comprise at least one pendant olefinically unsaturated group afford particular advantages and are therefore particularly preferred in accordance with the invention.

The polyurethane of the invention is hydrophobic or hydrophilic in the abovementioned sense. In terms of their use to prepare the graft copolymers of the invention, the hydrophilic polyurethanes of the invention afford advantages and are therefore used with preference.

The pendant olefinically unsaturated group either is attached to a cycloaliphatic group which represents a link in the polymer main chain or is present as a double bond in a cycloolefinic group which likewise represents a link in the polymer main chain.

The terminal olefinically unsaturated group is attached to a cycloaliphatic group which forms an end group of the polymer main chain, or it is present as a double bond in a cycloolefinic group which likewise forms an end group of the polymer main chain.

In accordance with the invention, two or more olefinically unsaturated groups may be attached to one cycloaliphatic group. It is of advantage, however, if only one olefinically unsaturated group is attached to one cycloaliphatic group.

Suitable olefinically unsaturated groups are, fundamentally, all groups containing at least one, especially one, double bond. In the context of the present invention, a double bond is a carbon-carbon double bond. Examples of highly suitable olefinically unsaturated groups are (meth) acrylate, ethacrylate, crotonate, cinnamate, vinyl ether, vinyl ester, vinyl, dicyclopentadienyl, norbornenyl, isoprenyl, isopropenyl, allyl and/or butenyl groups; dicyclopentadienyl ether, norbornenyl ether, isoprenyl ether, isopropenyl ether, allyl ether or butenyl ether groups; and/or dicyclopentadienyl ester, norbornenyl ester, isoprenyl ester, isopropenyl ester, allyl ester and/or butenyl ester groups. Of these, the vinyl groups are particularly advantageous and are therefore used with particular preference.

Similarly, two or more double bonds may be present in one cycloolefinic group. It is of advantage if there is only one double bond per cycloolefinic group.

In a polyurethane of the invention, both the above-described cycloaliphatic groups and the above-described cycloolefinic groups may be present.

In accordance with the invention, the cycloaliphatic groups are of advantage and are therefore used with preference.

The cycloaliphatic groups may be derived from any desired cycloaliphatics. In accordance with the invention it is of advantage if they are derived from cycloaliphatics having 4 to 12 carbon atoms in the molecule.

The cycloolefinic groups, similarly, may be derived from any desired cycloolefins. In accordance with the invention it is of advantage if they are derived from cycloolefins having 4 to 12 carbon atoms in the molecule.

Examples of highly suitable cycloaliphatics are cyclobutane, cyclopentane, cyclohexane, cycloheptane, cycloctane, norbornane, bicyclo[2.2.2]octane, decalin, hydroindane, dicylcopentene, tricyclodecane or adamantane, but especially cyclohexane.

Examples of highly suitable cycloolefins are cyclopentene, cyclohexene, cycloheptene, cyclooctene, norbornene, bicyclo[2.2.2]octene or dicylclopentene.

The polyurethane of the invention may be prepared by a very wide variety of methods of polymer chemistry. It is of advantage, however, to prepare the polyurethane of the invention by reacting (i) at least one polyurethane prepolymer having at least one free isocyanate group in the molecule with (ii) at least one cycloaliphatic having at least one, especially one, olefinically unsaturated group and having at least two, especially two, isocyanate-reactive groups in the molecule, and/or with (iii) at least one cycloolefin having at least one, especially one, double bond and having at least two, especially two, isocyanate-reactive groups in the molecule.

If an excess of isocyanate groups over the isocyanate-reactive groups is employed in the reaction, the cycloaliphatics (ii) and/or the cycloolefins (iii) are incorporated predominantly or exclusively into the polymer main chain. If, on the other hand, an excess of isocyanate-reactive groups over the isocyanate groups is employed, the cycloaliphatics (ii) and/or the cycloolefins (iii) are converted predominantly or exclusively to end groups. The skilled worker, therefore, is able easily to control the reaction so as to obtain polyurethanes of the invention having the desired structures.

The cycloaliphatics (ii) or the cycloolefins (iii) comprise at least two isocyanate-reactive groups. In other words, they may contain two, three, four or more isocyanate-reactive groups in the molecule. It is also possible to use mixtures of cycloaliphatics (ii) and/or cycloolefins (iii) each having a different number of isocyanate-reactive groups in the molecule. Thus it is possible, for example, to use mixtures of cycloaliphatics (ii) and/or cycloolefins (iii) having two and cycloaliphatics (ii) and/or cycloolefins (iii) having three isocyanate-reactive groups in the molecule. By this means it is possible to prepare branched polyurethanes of the invention in a simple manner. It is advantageous in this context to use the compounds (ii) and/or (iii) of higher functionality in minor amounts in order to prevent gelling of the reaction mixture. In the great majority of cases, however, only bifunctional cycloaliphatics (ii) and/or cycloolefins (iii) are used.

Examples of suitable isocyanate-reactive groups are and hydroxyl, thiol and/or primary and/or secondary amino groups. In accordance with the invention, hydroxyl groups are of advantage and are therefore used with preference.

Examples of suitable olefinically unsaturated groups for the cycloaliphatics (ii) are those described above, of which the vinyl groups is used with particular preference.

Examples of highly suitable cycloaliphatics (ii) are the positionally isomeric vinyl-substituted polyhydroxy derivatives, especially the dihydroxy derivatives, of cyclobutane, cyclopentane, cyclohexane, cycloheptane, cycloctane, norbornane, bicyclo[2.2.2]octane, decalin, hydroindane, dicylcopentane, tricylclodecane or adamantane.

Examples of highly suitable cycloolefins (iii) are the positionally isomeric polyhydroxy derivatives, especially the dihydroxy derivatives, of cyclopentene, cyclohexene, cycloheptene, cyclooctene, norbornene, bicyclo[2.2.2]octene or dicylclopentene.

In accordance with the invention, the positionally isomeric vinylcyclohexanadiols (ii) 1-vinylcyclohexane-2,6-, -3,6-, -4,6-, -2,3-, -3,4- and/or -3,5-diol are very particularly advantageous and are therefore used with very particular preference. The positionally isomeric vinylcyclohexanediols (ii) are customary and known compounds and are obtained as mixtures in industrial syntheses. In the text below, they are referred to for the sake of brevity as "vinylcyclohexanediol".

The polyurethane prepolymer (i) is of linear, branched or comb, but especially linear, construction. In this context the linear polyurethane prepolymer (i) includes preferably two free isocyanate groups, especially two terminal free isocyanate groups. The branched or comb-constructed polyurethane prepolymers (i) include preferably at least two, in particular more than two, free isocyanate groups, terminal free isocyanate groups being preferred.

In terms of method, the preparation of the polyurethane prepolymers (i) for use in accordance with the invention has no special features but instead takes place, for example, as described in patent DE 197 22 862 C1 or in patent applications DE 196 45 761 A1, EP 0 522 419 A1 or EP 0 522 420 A1, by reaction of a polyol, especially a diol, with at least one polyisocyanate, especially a diisocyanate, the isocyanate component being employed in a molar excess.

For the preparation of the polyurethane prepolymers (i) it is preferred to use diisocyanates and also, if desired, in minor amounts, polyisocyanates, for the purpose of introducing branches. In the context of the present invention, minor amounts are amounts which do not cause gelling of the polyurethane prepolymers (i) during their preparation. This may also be prevented by using small amounts of monoisocyanates.

Examples of suitable diisocyanates are isophorone diisocyanate (i.e., 5-isocyanato-1-isocyanatomethyl-1,3,3-trimethylcyclohexane), 5-isocyanato-1(2-isocyanatoeth-1-yl)-1,3,3-trimethylcyclohexane, 5-isocyanato-1-(3- isocyanatoprop-1-yl)-1,3,3-trimethylcyclohexane, 5-isocyanato-(4-isocyanatobut-1-yl)-1,3,3-trimethylcyclohexane, 1-isocyanato-2-(3-isocyanatoprop-1-yl)cyclohexane, 1-isocyanato-2-(3-isocyanatoeth-1-yl) cyclohexane, 1-isocyanato-2-(4-isocyanatobut-1-yl) cyclohexane, 1,2-diisocyanatocyclobutane, 1,3-diisocyanatocyclobutane, 1,2-diisocyanatocyclopentane, 1,3-diisocyanatocyclopentane, 1,2-diisocyanatocyclohexane, 1,3-diisocyanatocyclohexane, 1,4-diisocyanatocyclohexane, dicyclohexylmethane 2,4'-diisocyanate, trimethylene diisocyanate, tetramethylene diisocyanate, pentamethylene diisocyanate, hexamethylene diisocyanate, ethylethylene diisocyanate, trimethylhexane diisocyanate, heptanemethylene diisocyanate or diisocyanates derived from dimeric fatty acids, as marketed under the commercial designation DDI 1410 by the company Henkel and described in patents WO 97/49745 and WO 97/49747, especially 2-heptyl-3,4-bis(9-isocyanatononyl)-1-pentylcyclohexane, or 1,2-, 1,4- or 1,3-bis (isocyanatomethyl)cyclohexane, 1,2-, 1,4- or 1,3-bis(2-isocyanatoeth-1-yl)cyclohexane, 1,3-bis(3-isocyanatoprop-1-yl)cyclohexane, 1,2-, 1,4- or 1,3-bis(4-isocyanatobut-1-yl) cyclohexane, liquid bis(4-isocyanatocyclohexyl)methane with a trans/trans content of up to 30% by weight, preferably 25% by weight, and in particular 20% by weight, as is described [lacuna] patents DE 44 14 032 A1, GB 1 220 717 A, DE 16 18 795 A1 or DE 17 93 785 A1; tolylene diisocyanate, xylylene diisocyanate, bisphenylene diisocyanate, naphthylene diisocyanate or diphenylmethane diisocyanate.

Examples of suitable polyisocyanates are the isocyanurates of the diisocyanates described above.

Examples of highly suitable monoisocyanates are phenyl isocyanate, cyclohexyl isocyanate or stearyl isocyanate.

The polyurethane prepolymers (i) are also prepared using
saturated and unsaturated polyols of relatively high and low molecular mass, especially diols and, in minor amounts, triols for the purpose of introducing branches, and also, if desired,
compounds which introduce hydrophilic functional groups,
polyamines, and
amino alcohols.

Examples of suitable polyols are saturated or olefinically unsaturated polyester polyols which are prepared by reacting
unsulfonated or sulfonated saturated and/or unsaturated polycarboxylic acids or their esterifiable derivatives, alone or together with monocarboxylic acids, and
saturated and/or unsaturated polyols, alone or together with monools.

Examples of suitable polycarboxylic acids are aromatic, aliphatic and cycloaliphatic polycarboxylic acids. Preference is given to the use of aromatic and/or aliphatic polycarboxylic acids.

Examples of suitable aromatic polycarboxylic acids are phthalic acid, isophthalic acid, terephthalic acid, phthalic, isophthalic or terephthalic acid monosulfonate, or halophthalic acids, such as tetrachlorophthalic or tetrabromophthalic acid, among which isophthalic acid is advantageous and is therefore used with preference.

Examples of suitable acyclic aliphatic or unsaturated polycarboxylic acids are oxalic acid, malonic acid, succinic acid, glutaric acid, adipic acid, pimelic acid, suberic acid, azelaic acid, sebacic acid, undecanedicarboxylic acid or dodecanedicarboxylic acid, or maleic acid, fumaric acid or itaconic acid, of which adipic acid, glutaric acid, azelaic acid, sebacic acid, dimeric fatty acids and maleic acid are advantageous and are therefore used with preference.

Examples of suitable cycloaliphatic and cyclic unsaturated polycarboxylic acids are 1,2-cyclobutanedicarboxylic acid, 1,3-cyclobutanedicarboxylic acid, 1,2-cyclopentanedicarboxylic acid, 1,3-cyclopentanedicarboxylic acid, hexahydrophthalic acid, 1,3-cyclohexanedicarboxylic acid, 1,4-cyclohexanedicarboxylic acid, 4-methylhexahydrophthalic acid, tricyclodecanedicarboxylic acid, tetrahydrophthalic acid or 4-methyltetrahydrophthalic acid. These dicarboxylic acids may be used both in their cis and in their trans form and also as a mixture of both forms.

Further examples of suitable polycarboxylic acids are polymeric fatty acids, especially those having a dimer content of more than 90% by weight, which are also known as dimeric fatty acids.

Also suitable are the esterifiable derivatives of the above-mentioned polycarboxylic acids, such as their monoesters or polyesters with aliphatic alcohols having 1 to 4 carbon atoms or hydroxy alcohols having 1 to 4 carbon atoms, for example. It is also possible to use the anhydrides of the abovementioned polycarboxylic acids, where they exist.

Together with the polycarboxylic acids it is also possible if desired to use monocarboxylic acids, such as, for example, benzoic acid, tert-butylbenzoic acid, lauric acid isononanoic acid, fatty acids of naturally occurring oils, acrylic acid, methacrylic acid, ethacrylic acid or crotonic acid. The preferred monocarboxylic acid used is isononanoic acid.

Examples of suitable polyols are diols and triols, especially diols. Normally, triols are used alongside the diols in minor amounts in order to introduce branches into the polyester polyols. In the context of the present invention, minor amounts are amounts which do not cause gelling of the polyester polyols during their preparation.

Suitable diols are ethylene glycol, 1,2- or 1,3-propanediol, 1,2-, 1,3- or 1,4-butanediol, 1,2-, 1,3-, 1,4- or 1,5-pentanediol, 1,2-, 1,3-, 1,4-, 1,5- or 1,6-hexanediol, neopentyl hydroxypivalate, neopentyl glycol, diethylene glycol, 1,2-, 1,3- or 1,4-cyclohexanediol, 1,2-, 1,3- or 1,4-cyclohexanedimethanol, trimethylpentanediol, ethylbutylpropanediol or the positionally isomeric diethyloctanediols. These diols may also be used per se for the preparation of the polyurethanes (A) for use in accordance with the invention.

Further examples of suitable diols are diols of the formula I or II:

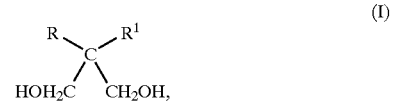

(I)

where R and $R^1$ are each an identical or different radical and are an alkyl radical having 1 to 18 carbon atoms, an aryl radical or a cycloaliphatic radical, with the proviso that R and/or $R^1$ must not be methyl;

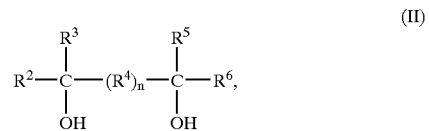

(II)

where $R^2$, $R^3$, $R^4$ and $R^6$ are each identical or different radicals and are an alkyl radical having 1 to 6 carbon atoms, a cycloalkyl radical or aryl radical and $R^4$ is an alkanediyl radical having 1 to 6 carbon atoms, an arylene radical or an unsaturated alkenediyl radical having 1 to 6 carbon atoms, and n is either 0 or 1.

Suitable diols I of the general formula I are all propanediols in which either R or $R^1$, or R and $R^1$ is or are not methyl, such as, for example, 2-butyl-2-ethyl-1,3-propanediol, 2-butyl-2-methyl-1,3-propanediol, 2-phenyl-2-methyl-1,3-propanediol, 2-propyl-2-ethyl-1,3-propanediol, 2-di-tert-butyl-1,3-propanediol, 2-butyl-2-propyl-1,3-propanediol, 1-dihydroxymethylbicyclo[2.2.1]heptane, 2,2-diethyl-1,3-propanediol, 2,2-dipropyl-1,3-propanediol or 2-cyclohexyl-2-methyl-1,3-propanediol, et cetera.

Examples of diols II of the general formula II that may be used are 2,5-dimethyl-2,5-hexanediol, 2,5-diethyl-2,5-hexanediol, 2-ethyl-5-methyl-2,5-hexanediol, 2,4-dimethyl-2,4-pentanediol, 2,3-dimethyl-2,3-butanediol, 1,4-(2'-hydroxypropyl)benzene and 1,3-(2'hydroxypropyl)benzene.

Of these diols, hexanediol and neopentyl glycol are particularly advantageous and are therefore used with particular preference.

The abovementioned diols may also be used per se to prepare the polyurethane prepolymers (i).

Examples of suitable triols are trimethylolethane, trimethylolpropane or glycerol, especially trimethylolpropane.

The abovementioned triols may also be used per se to prepare the polyurethane prepolymers (i) (cf. EP 0 339 433 A1).

If desired, minor amounts of monools may also be used. Examples of suitable monools are alcohols or phenols such as ethanol, propanol, n-butanol, sec-butanol, tert-butanol, amyl alcohols, hexanols, fatty alcohols, allyl alcohol, or phenol.

The polyester polyols may be prepared in the presence of small Amounts of a suitable solvent as entrainer. Examples of entrainers used are aromatic hydrocarbons, such as especially xylene and (cyclo)aliphatic hydrocarbons, e.g., cyclohexane or methylcyclohexane.

Further examples of suitable polyols are polyester diols which are obtained by reacting a lactone with a diol. They are notable for the presence of terminal hydroxyl groups and repeating polyester fractions of the formula —(—CO—($CHR^7$)$_m$—$CH_2$—O—)—. Here, the index m is preferably from 4 to 6 and the substituent $R^7$ is hydrogen or an alkyl, cycloalkyl, or alkoxy radical. No substituent contains more than 12 carbon atoms. The total number of carbon atoms in the substituent does not exceed 12 per lactone ring. Examples are hydroxycaproic acid, hydroxybutyric acid, hydroxydecanoic acid, and/or hydroxystearic acid.

Preferred for the preparation of the polyester diols is the unsubstituted caprolactone, where m is 4 and all substituents $R^7$ are hydrogen. The reaction with lactone is started by low molecular mass polyols such as ethylene glycol, 1,3-propanediol, 1,4-butanedlol, or dlmethylolcyclohexane. It is also possible, however, to react other reaction componenta, such as ethylenediamine; alkyl-dialkanolamines, or else urea, with caprolactone. Other suitable diols of relatively high molecular mass are polylactam diols, which are prepared by reacting, for example, caprolactam with low molecular mass diols.

Further examples of suitable polyols include polyether polyols, especially those having a number-average molecular weight of from 400 to 5000, in particular from 400 to 3000. Examples of highly suitable polyether diols are polyether diols of the general formula H—(—O—($CHR^8$)$_o$—)$_p$OH, where the substituent $R^8$ is hydrogen or a lower, unsubstituted or substitued alkyl radical, the index o is from 2 to 6, preferably from 3 to 4, and the index p is from 2 to 100, preferably from 5 to 50. Especially suitable examples are linear or branched polyether diols such as poly(oxyethylene) glycols, poly(oxypropylene) glycols, and poly(oxybutylene) glycols.

By means of the polyether diols it is possible to introduce nonionic hydrophilic functional groups into the main chain(s) of the polyurethane prepolymers (i).

Hydrophilic polyurethane prepolymers (i) comprise alternatively hydrophilic functional groups convertible to cations by neutralizing agents and/or quaternizing agents, and/or cationic groups, or functional groups convertible to anions by neutralizing agents, and/or anionic groups, and/or nonionic hydrophilic groups.

Examples of suitable functional groups for use in accordance with the invention and convertible to cations by neutralizing agents and/or quaternizing agents are primary, secondary or tertiary amino groups, secondary sulfide groups or tertiary phoshine groups, especially tertiary amino groups or secondary sulfide groups.

Examples of suitable cationic groups for use in accordance with the invention are primary, secondary, tertiary or quaternary ammonium groups, tertiary sulfonium groups or quaternary phosphonium groups, preferably quaternary ammonium groups or tertiary sulfonium groups, but especially tertiary ammonium groups.

Examples of suitable functional groups for use in accordance with the invention and convertible to anions by neutralizing agents are carboxylic acid, sulfonic acid or phosphonic acid groups, especially carboxylic acid groups.

Examples of suitable anionic groups for use in accordance with the invention are carboxylate, sulfonate or phosphonate groups, especially carboxylate groups.

Examples of suitable neutralizing agents for functional groups convertible to cations are organic and inorganic acids such as formic acid, acetic acid, lactic acid, dimethylolpropionic acid, citric acid, sulfuric acid, hydrochloric acid, and phosphoric acid.

Examples of suitable neutralizing agents for functional groups convertible to anions are ammonia or amines, such as trimethylamine, triethylamine, tributylamine, dimethylaniline, diethylaniline, triphenylamine, dimethylethanolamine, diethylethanolamine, methyldiethanolamine, 2-aminomethylpropanol, dimethylisopropylamine, dimethylisopropanolamine or triethanolamine, for example. Neutralization may take place in organic phase or in aqueous phase. Preferred neutralizing agents used are dimethylethanolamine and/or triethylamine.

The introduction of hydrophilic functional (potential) cationic groups into the polyurethane prepolymers (i) takes place by way of the incorporation of compounds which contain in the molecule at least one, especially two, isocyanate-reactive groups and at least one group capable of forming cations; the amount to be used may be calculated from the target amine number.

Suitable isocyanate-reactive functional groups are those described above. Examples of suitable compounds of this kind are 2,2-dimethylolethyl- or -propylamine blocked with a ketone, the resultant ketoxime group being hydrolyzed again prior to the formation of the cationic group, or N,N-dimethyl-, N,N-diethyl- or N-methyl-N-ethyl-2,2-dimethylolethyl- or -propylamine.

The introduction of hydrophilic functional (potentially) anionic groups into the polyurethane prepolymers (i) takes place by way of the incorporation of compounds which contain in the molecule at least one isocyanate-reactive group and at least one group capable of forming anions; the amount to be used may be calculated from the target acid number.

Examples of suitable compounds of this kind are those containing two isocyanate-reactlve groups in the molecule. Here again, suitable isocyanate-reactive groups are those described above. Accordingly it is possible, for example, to use alkanoic acids having two substituents on the β carbon atom. The substituent may be a hydroxyl group, an alkyl group, or, preferably, an alkylol group. These alkanoic acids have at least one, generally from 1 to 3, carboxyl groups in the molecule. They have 2 to about 25, preferably 3 to 10, carbon atoms. Examples of suitable alkanoic acids are dihydroxypropionic acid, dihydroxysuccinic acid, and dihydroxybenzoic acid. A particularly preferred group of alkanoic acids are the β,β-dimethylolalkanoic acids of the general formula R—C(CH$_2$OH)$_2$OOH, R$^9$ being a hydrogen atom or an alkyl group having up to about 20 carbon atoms. Examples of especially suitable alkanoic acids are 2,2-dimethylolacetic acid, 2,2-dimethylolpropionic acid, 2,2-dimenthylolbutyric acid, and 2,2-dimethylolpentanoic acid. The preferred dihydroxyaikarinoic acid is 2,2-dimethyiolpropionic acid. Examples of compounds containing amino groups are β,β-diaminovaieric acid, 3,4-diaminobenzoic acid, 2,4-diaminotoluenesulfonic acid, and 2,4-dlamlnodiphenyl ether sulfonic acid.

Hydrophilic functional nonionic poly(oxyalkylene) groups may be introduced as lateral or terminal groups into the polyurethane molecules. For this purpose it is possible to use not only the above-described polyether diols but also, for example, alkoxypoly(oxyalkylene) alcohols having the general formula R$^{10}$O—(—CH$_2$—CHR$^{11}$—O—)$_r$H, where R$^{10}$ is an alkyl radical having 1 to 6 carbon atoms, R$^{11}$ is a hydrogen atom or an alkyl radical having 1 to 6 carbon atoms, and the index r is a number between 20 and 75 (cf. patents EP 0 354 261 A1 or EP 0 424 705 A1).

The hydrophilic functional groups are to be selected so as to rule out the possibility of any disruptive reactions, such as, for instance, salt formation or crosslinking with the functional groups that may be present in the other constituents of the polyurethane of the invention, of the graft copolymers of the invention, of the coating material of the invention, of the sealing compound of the invention, or of the adhesive of the invention. The skilled worker will therefore be able to make the selection in a simple manner on the basis of his or her knowledge in the art.

Of these hydrophilic functional (potentially) ionic groups and the hydrophilic functional nonionic groups, the (potentially) anionic groups are advantageous and are therefore used with particular preference.

To prepare the hydrophilic and the hydrophobic polyurethane prepolymers (i) it is possible to use polyamines and amino alcohols which bring about an increase in the molecular weight of the polyurethane prepolymers (i). The essential point in this context is that the polyamines and amino alcohols are employed in an amount such that there are still free isocyanate groups remaining in the molecule.

Examples of suitable polyamines have at least two primary and/or secondary amino groups. Polyamines are essentially alkylene polyamines having 1 to 40 carbon atoms, preferably about 2 to 15 carbon atoms. They may carry substituents which have no hydrogen atoms that are reactive with isocyanate groups. Examples are nor vamines having a linear or branched aliphatic, cycloaliphatic or aromatic structure and at least two primary amino groups.

Diamines include hydrazine, ethylenediamine, propylenediamine, 1,4-butylenediamine, piperazine, 1,4-cyclohexyldimethylamine, 1,6-hexamethylenediamine, trimethylhexamethylenediamine, menthanediamine, isophoronediamine, 4,4'-diaminodicyclohexylmethane, and aminoethylethanolamine. Preferred diamines are hydrazine, alkyl- or cycloalkyldiamines such as propylenediamine and 1-amino-3-aminomethyl-3,5,5-trimethylcyclohexane.

It is also possible to use polyamines containing more than two amino groups in the molecule. In these cases, however, it should be ensured—for example, by using monoamines as well—that no crosslinked polyurethane resins are obtained. Polyamines of this kind which may be used are diethylenetriamine, triethylenetetramine, dipropylenediamine, and dibutylenetriamine. An example of a monoamine is ethylhexylamine (cf. patent EP 0 089 497 B1).

Examples of suitable amino alcohols are ethanolamine and diethanolamine.

Furthermore, to prepare the hydrophilic and hydrophobic polyurethane prepolymers (i) it is possible to use customary and known compounds by means of which olefinically unsaturated groups are introduced. As is known, such compounds contain at least two isocyanate-reactive functional groups, especially hydroxyl groups, and at least one olefinically unsaturated group. Examples of suitable compounds of this kind are known from DE 197 22 862 C1 or patent applications DE 196 45 761 A1, EP 0 522 419 A1 or EP 0 522 420 A1. Where used, they are employed in minor amounts, so that the profile of properties of the polyurethanes of the invention is determined by the above-described olefinically unsaturated groups for use in accordance with the invention.

The preparation of the polyurethane prepolymers (i) from the constituents described above has no special features as to method but instead takes place in accordance with the customary and known methods of polyurethane chemistry, as known, for example, from the documents recited above.

The preparation of the polyurethanes of the invention from the above-described polyurethane prepolymers (i) and the above-described cycloaliphatics (ii) and/or cycloolefins (iii), especially the cycloaliphatics (ii), likewise has no special features as to its method but instead takes place in bulk or in an inert organic medium, preferably in an inert organic medium, preference being given to the use of polar organic solvents.

It is essential that the reaction takes place until the free isocyanate group content in the reaction mixture stabilizes or until free isocyanate groups can no longer be detected. If free isocyanate groups are present after the reaction, they are preferably reacted with at least one polyol, polyamine and/or amino alcohol, as described above. This results in an extension of the chain of the polyurethane of the invention.

The amount of cycloaliphatics (ii) and/or cycloolefins (iii) incorporated by reaction in the polyurethanes of the invention may vary very widely. Preferably it is from 0.01 to 30, more preferably from 0.1 to 25, with particular preference from 0.2 to 20, with very particular preference from 0.25 to 15, and in particular from 0.3 to 10% by weight, based in each case on the polyurethane of the invention.

The polyurethanes of the invention may be used as such to prepare coating materials, especially paints, and also adhesives and sealing compounds.

A particular advantage is that the polyurethanes of the invention, owing to their double bond content, may be used to prepare coating materials, especially paints, and also adhesives and sealing compounds, which may be cured with actinic radiation or by dual cure.

Where the polyurethanes of the invention are hydrophilic, it is of advantage in accordance with the invention to use them in the form of a dispersion in an aqueous medium The aqueous medium contains essentially water. The aqueous medium may include minor amounts of organic solvents, neutralizing agents, crosslinking agents and/or customary coatings additives and/or other dissolved solid, liquid or gaseous organic and/or inorganic substances of low and/or high molecular mass. In the context of the present invention, the term "minor amount" means an amount which does not change the aqueous nature of the aqueous medium. The aqueous medium, however, may also comprise just water.

For the purpose of dispersion, the hydrophilic polyurethanes of the invention, containing the above-described (potentially) anionic or cationic hydrophilic groups, are neutralized with at least one of the above-described neutralizing agents and subsequently are dispersed. In the case of the hydrophilic polyurethanes of the invention which contain only the nonionic hydrophilic functional groups, the use of neutralizing agents is unnecessary.

The resultant secondary polyurethane dispersions of the invention are likewise outstandingly suited to the preparation of aqueous coating materials, adhesives, and sealing compounds. In particular, they are suitable for preparing the graft copolymers of the invention.

The graft copolymers of the invention are preparable by (co)polymerizing at least one monomer (a) in the presence of at least one polyurethane of the invention.

If hydrophilic polyurethanes and predominantly hydrophobic monomers (a) are employed in this preparation, it results in finely divided graft copolymers of the invention having a hydrophobic core comprising at least one copolymerized olefinically unsaturated monomer (a) and a hydrophilic shell comprising or consisting of at least one hydrophilic polyurethane of the invention. This variant of the graft copolymers of the invention is prepared by dispersing at least one hydrophilic polyurethane of the invention in an aqueous medium, and subsequently free-radically (co) polymerizing at least one hydrophobic olefinically unsaturated monomer (a) in its presence in emulsion.

If, on the other hand, hydrophobic polyurethanes and predominantly hydrophilic monomers (a) are employed, the result is finely divided graft copolymers of the invention having a hydrophobic core comprising or consisting of at least one hydrophobic polyurethane of the invention and a hydrophilic shell comprising at least one hydrophilic, olefinically unsaturated monomer (a) in copolymerized form. This variant is prepared by dispersing at least one hydrophobic polyurethane of the invention in an aqueous medium. Advantageously, this is done in a strong shear field. Viewed in terms of its method, this process has no special features, but instead may take place, for example, in accordance with the dispersion techniques described in European Patent Application EP 0 401 565 A1. According to this, at least one hydrophilic olefinically unsaturated monomer (a) is (co) polymerized in the presence of the dispersed hydrophobic polyurethanes of the invention.

All conceivable gradations of the hydrophilicity and, respectively, the hydrophobicity of the polyurethanes of the invention on the one hand and of the monomers (a) on the other, between these two extremes, are possible, so that it is also possible for graft copolymers of the invention to result which have no, or no pronounced, core-shell structure.

Furthermore, the graft copolymers of the invention may be prepared using the (co)polymerization processes described below.

Examples of hydrophilic and hydrophobic monomers (a) suitable for preparing the graft copolymers of the invention are the following:

Monomers (a1):

Hydroxyalkyl esters of acrylic acid, methacrylic acid or another alpha,beta-ethylenically unsaturated carboxylic acid which are derived from an alkylene glycol which is esterified with the acid, or are obtainable by reacting the acid with alkylene oxide, especially hydroxyalkyl esters of acrylic acid, methacrylic acid or ethacrylic acid in which the hydroxyalkyl group contains up to 20 carbon atoms, such as 2-hydroxyethyl, 2-hydroxypropyl, 3-hydroxypropyl, 3-hydroxybutyl, 4-hydroxybutyl acrylate, methacrylate, ethacrylate or crotonate; 1,4-bis(hydroxymethyl) cyclohexane, octahydro-4,7-methano-1H-indenedimethanol or methylpropanediol monoacrylate, monomethacrylate, monoethacrylate or monocrotonate; or reaction products of cyclic esters, such as $\epsilon$-caprolactone, for example, and these hydroxyalkyl esters; or olefinically unsaturated alcohols such as allyl alcohol or polyols such as trimethylolpropane monoallyl or diallyl ether or pentaerythritol monoallyl, diallyl or triallyl ether. These monomers (a1) of higher functionality are generally used only in minor amounts. In the context of the present invention, minor amounts of higher-functional monomers here are amounts which do not result in the crosslinking or gelling of the polyacrylate resins. Thus, for example, the proportion of trimethylolpropane monoallyl ether may be from 2 to 10% by weight, based on the overall weight of the monomers (a1) to (a6) used to prepare the polyacrylate resin.

Monomers (a2):

(Meth)acrylic alkyl or cycloalkyl esters having up to 20 carbon atoms in the alkyl radical, especially methyl, ethyl, propyl, n-butyl, sec-butyl, tert-butyl, hexyl, ethylhexyl, stearyl and lauryl acrylate or methacrylate; cycloaliphatic (meth)acrylic esters, especially cyclohexyl, isobornyl, dicyclopentadienyl, octahydro-4,7-methano-1H-indenedimethanol or tert-butylcyclohexyl (meth)acrylate; (meth)acrylic oxaalkyl esters or oxacycloalkyl esters such as ethyltriglycol (meth)acrylate and methoxyoligoglycol (meth)acrylate having a molecular weight Mn of preferably 550; or other ethoxylated and/or propoxylated hydroxyl-free (meth)acrylic acid derivatives. These may include, in minor amounts, higher-functional (meth)acrylic alkyl or cycloalkyl esters such as ethylene glycol, propylene glycol, diethylene glycol, dipropylene glycol, butylene glycol, 1,5-pentanediol, 1,6-hexanediol, octahydro-4,7-methano-1H-indenedimethanol or cyclohexane-1,2-, -1,3- or -1,4-diol di(meth)acrylate; trimethylolpropane di- or tri(meth) acrylate; or pentaerythritol di-, tri- or tetra(meth)acrylate. In the context of the present invention, minor amounts of higher-functional monomers (a2) here are amounts which do not cause crosslinking or gelling of the polyacrylate resins.

Monomers (a3):

Ethylenically unsaturated monomers which carry at least one acid group, preferably a carboxyl group, per molecule, or a mixture of such monomers. As monomers (a3) it is particularly preferred to use acrylic acid and/or methacrylic acid. It is also possible, however, to use other ethylenically unsaturated carboxylic acids having up to 6 carbon atoms in the molecule. Examples of such acids are ethacrylic acid, crotonic acid, maleic acid, fumaric acid, and itaconic acid. It is also possible to use ethylenically unsaturated sulfonic or phosphonic acids, and/or their partial esters, as component (a3). Further suitable monomers (a3) include mono(meth) acryloyloxyethyl maleate, succinate, and phthalate.

Monomers (a4):

Vinyl esters of alpha-branched monocarboxylic acids having 5 to 18 carbon atoms in the molecule. The branched monocarboxylic acids may be obtained by reacting formic acid or carbon monoxide and water with olefins in the presence of a liquid, strongly acidic catalyst; the olefins may be cracking products from paraffinic hydrocarbons, such as mineral oil fractions, and may contain both branched and straight-chain acyclic and/or cycloaliphatic olefins. In the reaction of such olefins with formic acid and/or with carbon monoxide and water, a mixture of carboxylic acids is formed in which the carboxyl groups are located predominantly on a quaternary carbon atom. Other olefinic starting materials are, for example, propylene trimer, propylene tetramer, and diisobutylene. Alternatively, the vinyl esters may be prepared in a conventional manner from the acids, for example, by reacting the acid with acetylene. Particular preference—owing to their ready availability—is given to the use of vinyl esters of saturated aliphatic monocarboxylic acids having 9 to 11 carbon atoms and being branched on the alpha carbon atom.

Monomers (a5):

Reaction product of acrylic acid and/or methacrylic acid with the glycidyl ester of an alpha-branched monocarboxylic acid having 5 to 18 carbon atoms per molecule. The reaction of the acrylic or methacrylic acid with the glycidyl ester of a carboxylic acid having a tertiary alpha carbon atom may take place before, during or after the polymerization reaction. As component (a5) it is preferred to use the reaction product of acrylic and/or methacrylic acid with the glycidyl ester of Versatic® acid. This glycidyl ester is obtainable commercially under the name Cardura® E10. For further details, reference is made to Römpp Lexikon Lacke und Druckfarben, Georg Thieme Verlag, Stuttgart, N.Y., 1998, pages 605 and 606.

Monomers (a6):

Ethylenically unsaturated monomers essentially free from acid groups, such as olefins, such as ethylene, propylene, 1-butene, 1-pentene, 1-hexene, cyclohexene, cyclopentene, norbornene, butadiene, isoprene, cyclopentadiene and/or dicyclopentadiene;

(meth)acrylamides such as (meth)acrylamide, N-methyl-, N,N-dimethyl-, N-ethyl-, N,N-diethyl-, N-propyl-, N,N-dipropyl, N-butyl-, N,N-dibutyl-, N-cyclohexyl- and/or N,N-cyclohexyl-methyl(meth)acrylamide;

monomers containing epoxide groups, such as the glycidyl ester of acrylic acid, methacrylic acid, ethacrylic acid, crotonic acid, maleic acid, fumaric acid and/or itaconic acid;

vinylaromatic hydrocarbons, such as styrene, alpha-alkylstyrenes, especially alpha-methylstyrene, and/or vinyltoluene;

diarylethylenes, especially those of the general formula III:

$$R^{12}R^{13}C{=}CR^{14}R^{15} \qquad (III)$$

where the radicals $R^{12}$, $R^{13}$, $R^{14}$ and $R^{15}$ each independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^{12}$, $R^{13}$, $R^{14}$ and $R^{15}$ are substituted or unsubstituted aryl, arylalkyl or arylcycloalkyl radicals, especially substituted or unsubstituted aryl radicals. Examples of suitable alkyl radicals are methyl, ethyl, propyl, isopropyl, n-butyl, isobutyl, tert-butyl, amyl, hexyl or 2-ethylhexyl. Examples of suitable cycloalkyl radicals are cyclobutyl, cyclopentyl or cyclohexyl. Examples of suitable alkylcycloalkyl radicals are methylenecyclohexane, ethylenecyclohexane, or 1,3-propanediylcyclohexane. Examples of suitable cyloalkylalkyl radicals are 2-, 3- or 4-methyl-, -ethyl-, -propyl- or -butylcyclohex-1-yl. Examples of suitable aryl radicals are phenyl, naphthyl or biphenylyl, preferably phenyl and naphthyl, and especially phenyl. Examples of suitable alkylaryl radicals are benzyl or ethylene- or 1,3propanediylbenzene. Examples of suitable cycloalkylaryl radicals are 2-, 3- or 4-phenylcyclohex-1-yl. Examples of suitable arylalkyl radicals are 2-, 3- or 4-methyl-, -ethyl-, -propyl- or -butylphen-1-yl. Examples of suitable arylcycloalkyl radicals are 2-, 3- or 4-cyclohexylphen-1-yl. The aryl radicals $R^{12}$, $R^{13}$, $R^{14}$ and/or $R^{15}$ are preferably phenyl or naphthyl radicals, especially phenyl radicals. The substituents that may be present in the radicals $R^{12}$, $R^{13}$, $R^{14}$ and/or $R^{15}$ are electron withdrawing or electron donating atoms or organic radicals, especially halogen atoms, nitrile, nitro, partially or fully halogenated alkyl, cycloalkyl, alkylcycloalkyl, cycloalkylalkyl, aryl, alkylaryl, cycloalkylaryl, arylalkyl and arylcycloalkyl radicals; aryloxy, alkyloxy and cycloalkyloxy radicals; arylthio, alkylthio and cycloalkylthio radicals, and/or primary, secondary and/or tertiary amino groups. Diphenylethylene, dinaphthaleneethylene, cis- or trans-stilbene, vinylidene-bis(4-N,N-dimethylaminobenzene), vinylidenebis(4-aminobenzene) or vinylidenebis(4-nitrobenzene), especially diphenylethylene (DPE), are particularly advantageous and so are used with preference. Preferably, these monomers (a6) are used not as the sole monomers but rather always together with other monomers (a), in which case they regulate the copolymerization advantageously such that free-radical copolymerization in batch mode is also possible;

nitriles such as acrylonitrile and/or methacrylonitrile;

vinyl compounds such as vinyl chloride, vinyl fluoride, vinylidene dichloride, vinylidene difluoride; N-vinylpyrrolidone; vinyl ethers such as ethyl vinyl ether, n-propyl vinyl ether, isopropyl vinyl ether, n-butyl vinyl ether, isobutyl vinyl ether and/or vinyl cyclohexyl ether; vinyl esters such as vinyl acetate, vinyl propionate, vinyl butyrate, vinyl pivalate, vinyl esters of Versatic® acids, which are marketed under the brand name VeoVa® by the company Deutsche Shell Chemie (for further details, reference is made to Römpp Lexikon Lacke und Druckfarben, Georg Thieme Verlag, Stuttgart, N.Y., 1998, page 598 and also pages 605 and 606), and/or the vinyl ester of 2-methyl-2-ethylheptanoic acid; and/or polysiloxane macromonomers having a number-average molecular weight Mn of from 1000 to 40,000, preferably from 2000 to 20,000, with particular preference from 2500 to 10,000, and in particular from 3000 to 7000, and having on average from 0.5 to 2.5, preferably from 0.5 to 1.5, ethylenically unsaturated double bonds per molecule, as are described in DE 38 07 571 A1 on pages 5 to 7, in DE 37 06 095 A1 in columns 3 to 7, in EP 0 358 153 B1 on pages 3 to 6, in U.S. Pat. No. 4,754,014 A in columns 5 to 9, in DE 44 21 823 A1, or in international Patent Application WO 92/22615 on page 12 line 18 to page 18 line 10, or acryloxysilane-containing vinyl monomers, preparable by reacting hydroxy-functional silanes with epichlorohydrin and then reacting the reaction product with methacrylic acid and/or hydroxyalkyl esters of (meth)acrylic acid.

From these suitable monomers (a) described above by way of example, the skilled worker is easily able to select, on the basis of their known physicochemical properties and reactivities, the hydrophilic or hydrophobic monomers (a) that are particularly suitable for the intended use in question.

If desired, he or she may for this purpose conduct a few preliminary rangefinding experiments. In particular, he or she will be careful to ensure that monomers (a) contain no functional groups, especially (potentially) ionic functional groups, which enter into unwanted interactions with the (potentially) ionic functional groups in the hydrophilic polyurethanes of the invention.

In accordance with the invention, particular advantages result if the monomers (a) are selected such that the profile of properties of the grafted (co)polymers is determined essentially by the above-described hydrophilic or hydrophobic (meth)acrylate monomers (a), the other monomers (a) advantageously providing broad variation of this profile of properties.

In accordance with the invention, very particular advantages result from using mixtures of the monomers (a1), (a2) and (a6) and also, if desired, (a3).

Viewed in terms of method, the preparation of the graft copolymers of the invention has no special features but instead takes place in accordance with the customary and known methods of free-radical (co)polymerization in bulk, solution or emulsion in the presence of at least one polymerization initiator.

Where the (co)polymerization takes place in bulk or solution, the graft copolymer of the invention may be used or processed further in this form. In particular, it is dispersed in an aqueous medium, so giving a secondary dispersion of the invention.

The (co)polymerization is preferably conducted in emulsion, such as is described, for example, in patent DE 197 22 862 C1 or in patent applications DE 196 45 761 A1, EP-A-522 419 A1 or EP 0 522 420 A1, or in miniemulsion or microemulsion. Regarding miniemulsion and microemulsion, reference is made, for further details, to the patent applications and the literature references DE 196 28 142 A1, DE 196 28 143 A1 or EP 0 401 565 A1, emulsion polymerization and emulsion polymers, editors P. A. Lovell and Mohamed S. El-Aasser, John Wiley and Sons, Chichester, N.Y., Weinheim, 1997, pages 700 et seq.; Mohamed S. El-Aasser, Advances in Emulsion Polymerization and Latex Technology, 30th Annual Short Course, Volume 3, Jun. 7–11, 1999, Emulsion Polymers Institute, Lehigh University, Bethlehem, Pa., U.S.A. In the case of (co)polymerization in emulsion, miniemulsion or microemulsion, the graft copolymers of the invention are obtained in the form of primary dispersions of the invention.

Suitable reactors for the (co)polymerization processes are the customary and known stirred vessels, cascades of stirred vessels, tube reactors, loop reactors or Taylor reactors, as described, for example, in patents DE-B-1 071 241 A1, EP 0 498 583 A1 or DE 198 28 742 A1 or in the article by K. Kataoka in Chemical Engineering Science, Volume 50, No. 9, 1995, pages 1409 to 1416.

The (co)polymerization is advantageously conducted at temperatures above room temperature and below the lowest decomposition temperature of the monomers used in each case, the temperature range chosen being preferably from 30 to 180° C., with very particular preference from 70 to 150° C., and in particular from 80 to 110° C.

Where especially volatile monomers (a) and/or emulsions are used, the (co)polymerization may also be conducted under superatmospheric pressure, preferably under from 1.5 to 3000 bar, with particular preference from 5 to 1500 bar, and in particular from 10 to 1000 bar.

Examples of suitable polymerization initiators are initiators which form free radicals, such as dialkyl peroxides, such as di-tert-butyl peroxide or dicumyl peroxide; hydroperoxides, such as cumene hydroperoxide or tert-butyl hydroperoxide; peresters, such as tert-butyl perbenzoate, tert-butyl perpivalate, tert-butyl per-3,5,5-trimethylhexanoate, or tert-butyl per-2-ethylhexanoate; potassium, sodium or ammonium peroxodisulfate; azo dinitriles such as azobisisobutyronitrile; C—C-cleaving initiators such as benzpinacol silyl ether; or a combination of a nonoxidizing initiator with hydrogen peroxide. Preference is given to the use of water-insoluble initiators. The initiators are used preferably in an amount of from 0.1 to 25% by weight, with particular preference from 2 to 10% by weight, based on the overall weight of the monomers (a).

In the graft copolymers of the invention the proportion of core to shell or of polyurethane of the invention to grafted-on monomers (a) may vary extremely widely, which is a particular advantage of the graft copolymers of the invention. This ratio is preferably from 1:100 to 100:1, more preferably from 1:50 to 50:1, with particular preference from 30:1 to 1:30, with very particular preference from 20:1 to 1:20, and in particular from 10:1 to 1:10. Very particular advantages result if this ratio is approximately from 3.5:1 to 1:3.5, in particular from 1.5:1 to 1:1.5.

The graft copolymers of the invention may be isolated from the primary dispersions in which they are produced and may be passed on for a very wide variety of end uses, especially in solventborne, water- and solvent-free pulverulent solid or water- and solvent-free liquid coating materials, adhesives, and sealing compounds. In accordance with the invention, however, it is of advantage to use the primary dispersions as such se to prepare aqueous coating materials, adhesives, and sealing compounds.

In addition to the polyurethanes of the invention and the graft copolymers of the invention, the aqueous adhesives of the invention may comprise further suitable customary and known constituents in effective amounts. Examples of suitable constituents are the crosslinking agents and additives described below, provided they are suitable for preparing adhesives.

In addition to the polyurethanes of the invention and the graft copolymers of the invention, the aqueous sealing compounds of the invention may likewise comprise further suitable customary and known constituents in effective amounts. Examples of suitable constituents are likewise the crosslinking agents and additives described below, provided they are suitable for preparing sealing compounds.

The primary dispersions of the graft copolymers of the invention are especially suitable for preparing the aqueous coating materials of the invention, especially the aqueous coating materials of the invention. Examples of aqueous coating materials of the invention are surfacers, solid-color topcoats, aqueous basecoats, and clearcoats. The primary dispersions of the invention develop very particular advantages when used to prepare the aqueous basecoats of the invention.

In the aqueous basecoats of the invention, the polyurethanes and/or the graft copolymers of the invention, but especially the graft copolymers of the invention, are present advantageously in an amount of from 1.0 to 50, preferably from 2.0 to 40, with particular preference from 3.0 to 35, with very particular preference from 4.0 to 30, and in particular from 5.0 to 25% by weight, based in each case on the overall weight of the respective aqueous basecoat of the invention.

The further essential constituent of the aqueous basecoat of the invention is at least one color and/or effect pigment. The pigments may comprise organic or inorganic compounds. On the basis of this large number of appropriate pigments, therefore, the aqueous basecoat of the invention ensures a universal scope for use and makes it possible to realize a large number of color shades and optical effects.

Effect pigments which may be used include metal flake pigments such as commercial aluminum bronzes, aluminum bronzes chromated in accordance with DE-A-36 36 183, commercial stainless steel bronzes, and nonmetallic effect pigments, such as pearlescent pigments and interference pigments, for example. For further details, reference is made to Römpp Lexikon Lacke und Druckfarben, Georg Thieme Verlag, 1998, page 176, "Effect pigments" and pages 380 and 381 "Metal oxide-mica pigments" to "Metal pigments".

Examples of suitable inorganic color pigments are titanium dioxide, iron oxides, sicotrans yellow, and carbon black. Examples of suitable organic color pigments are thioindigo pigments, indanthrene blue, Cromophthal red, Irgazine orange and Heliogen green. For further details, reference is made to Römpp Lexikon Lacke und Druckfarben, Georg Thieme Verlag, 1998, pages 180 and 181, "Iron blue pigments" to "Black iron oxide", pages 451 to 453 "Pigments" to "Pigment volume concentration", page 563 "Thioindigo pigments", and page 567 "Titanium dioxide pigments".

The proportion of the pigments in the aqueous basecoat of the invention may vary extremely widely and is guided in particular by the hiding power of the pigments, by the desired shade, and by the desired optical effect. Preferably, the pigments are present in the aqueous basecoat of the invention in an amount of from 0.5 to 50, more preferably from 0.5 to 45, with particular preference from 0.5 to 40, with very particular preference from 0.5 to 35, and in particular from 0.5 to 30% by weight, based in each case on the overall weight of the aqueous basecoat of the invention. In this context, the pigment/binder ratio, i.e., the ratio of the pigments to the polyurethanes of the invention and/or to the graft copolymers of the invention, and also other binders that may be present, may vary extremely widely. Preferably, this ratio is from 6.0:1.0 to 1.0:50, more preferably from 5:1.0 to 1.0:50, with particular preference from 4.5:1.0 to 1.0:40, with very particular preference from 4:1.0 to 1.0:30, and in particular from 3.5:1.0 to 1.0:25.

These pigments may also be incorporated into the aqueous basecoats of the invention by way of pigment pastes, in which case suitable grinding resins include, inter alia, the polyurethanes of the invention and/or the graft copolymers of the invention.

These pigments are omitted when the coating material of the invention is used as a clearcoat.

The coating material of the invention, especially the aqueous basecoat of the invention, may comprise at least one crosslinking agent.

Examples of suitable crosslinking agents are amino resins, as described for example in Römpp Lexikon Lacke und Druckfarben, Georg Thieme Verlag, 1998, page 29, "Amino resins", in the text book "Lackadditive" [Coatings additives] by Johan Bieleman, Wiley-VCH, Weinheim, N.Y., 1998, pages 242 et seq., in the book "Paints, Coatings and Solvents", second, completely revised edition, edited by D. Stoye and W. Freitag, Wiley-VCH, Weinheim, N.Y., 1998, pages 80 ff., in patents U.S. Pat. No. 4 710 542 A1 or EP-B-0 245 700 A1, and in the article by B. Singh and coworkers, "Carbamylmethylated melamines, Novel Crosslinkers for the Coatings Industry" in Advanced Organic Coatings Science and Techology Series, 1991, Volume 13, pages 193 to 207; carboxyl-containing compounds or resins, as described for example in patent DE 196 52 813 A1; compounds or resins containing epoxide groups, as described for example in patents EP 0 299 420 A1, DE 22 14 650 B1, DE 27 49 576 B1, U.S. Pat. No. 4,091,048 A1 or U.S. Pat. No. 3,781,379 A1; blocked and nonblocked polyisocyanates, as described for example in patents U.S. Pat. No. 4,444,954 A1, DE 196 17 086 A1, DE 196 31 269 A1, EP 0 004 571 A1 or EP 0 582 051 A1; and/or tris (alkoxycarbonylamino)triazines, as described in patents U.S. Pat. No. 4,939,213 A1, U.S. Pat. No. 5,084,541 A1, U.S. Pat. No. 5,288,865 A1 or EP 0 604 922 A1.

The epoxides and the nonblocked polyisocyanates, especially the polyisocyanates, are employed in two-component or multicomponent systems.

Where the aqueous basecoats of the invention are one-component systems, it is preferred to use amino resins as the predominant or sole crosslinking agents. The other above-mentioned crosslinking agents may be used as additional crosslinking agents for further advantageous variation of the profile of properties of the aqueous basecoats of the invention and of the basecoats of the invention and multicoat color and/or effect coating systems of the invention produced therefrom, in which case their proportion among the crosslinking agents is <50% by weight.

Preferably, the crosslinking agents are employed in the aqueous basecoats of the invention in an amount of from 0.1 to 30, more preferably from 0.3 to 20, with particular preference from 0.5 to 10, and in particular from 1.0 to 8.0% by weight, based in each case on the overall weight of the respective aqueous basecoat of the invention.

In addition to the above-described constituents, the coating material of the invention, especially the aqueous basecoat, may comprise customary and known binders and/or additives in effective amounts.

Examples of customary and known binders are oligomeric and polymeric, thermally curable, linear and/or branched and/or block, comb and/or random poly(meth)acrylates or acrylate copolymers, especially those described in patent DE 197 36 535 A1, polyesters, especially those described in patents DE 40 09 858 A1 or DE 44 37 535 A1, alkyds, acrylated polyesters, polylactones, polycarbonates, polyethers, epoxy resinamine adducts, (meth)acrylate diols, partially hydrolyzed polyvinyl esters, polyurethanes and acrylated polyurethanes, as described in patents EP 0 521 928 A1, EP 0 522 420 A1, EP 0 522 419 A1, EP 0 730 613 A1 or DE 44 37 535 A1, or polyureas.

If the coating material of the invention is to be curable not only thermally but also with actinic radiation, especially UV radiation and/or electron beams (dual cure), it comprises at least one constituent which is activatable with actinic radiation.

Suitable activatable constituents are in principle all oligomeric and polymeric compounds that are curable with actinic radiation, especially UV radiation and/or electron beams, and which are commonly used in the field of UV-curable or electron-beam-curable coating materials.

It is advantageous to use radiation-curable binders as activatable constituents. Examples of suitable radiation-curable binders are (meth)acrylic-functional (meth)acrylic copolymers, polyether acrylates, polyester acrylates, unsaturated polyesters, epoxy acrylates, urethane acrylates, amino acrylates, melamine acrylates, silicone acrylates, isocyanato acrylates, and the corresponding methacrylates. It is preferred to use binders which are free from aromatic structural units. Preference is therefore given to the use of urethane (meth)acrylates and/or polyester (meth)acrylates, aliphatic urethane acrylates being particularly preferred.

Examples of suitable additives are
   organic and inorganic fillers such as chalk, calcium sulfate, barium sulfate, silicates such as talc or kaolin, silicas, oxides such as aluminum hydroxide or magnesium hydroxide, or organic fillers such as textile fibers, cellulose fibers, polyethylene fibers or wood flour; for further details reference is made to Römpp Lexikon Lacke und Druckfarben, Georg Thieme Verlag, 1998, pages 250 ff., "Fillers";

thermally curable reactive diluents such as positionally isomeric diethyloctanediols or hydroxyl-containing hyperbranched compounds or dendrimers, as described in patent applications DE 198 09 643 A1, DE 198 40 605 A1 or DE 198 05 421 A1;

reactive diluents curable with actinic radiation, as described in Römpp Lexikon Lacke und Druckfarben, Georg Thieme Verlag, Stuttgart, N.Y., 1998, on page 491 under the entry "Reactive diluents";

photoinitiators and coinitiators, as described in Römpp Lexikon Lacke und Druckfarben, Georg Thieme Verlag, Stuttgart, 1998, pages 444 to 446;

low-boiling and/or high-boiling organic solvents ("long solvents");

UV absorbers;

light stabilizers such as HALS compounds, benzotriazoles or oxalanilides;

free-radical scavengers;

thermally labile free-radical initiators such as organic peroxides, organic azo compounds or C—C-cleaving initiators such as dialkyl peroxides, peroxocarboxylic acids, peroxodicarbonates, peroxide esters, hydroperoxides, ketone peroxides, azo dinitriles or benzpinacol silyl ether;

crosslinking catalysts such as dibutyltin dilaurate, lithium decanoate or zinc octoate, or amine-blocked organic sulfonic acids;

devolatilizers such as diazadicycloundecane;

slip additives;

polymerization inhibitors;

defoamers;

emulsifiers, especially nonionic emulsifiers such as alkoxylated alkanols, polyols, phenols and alkylphenols or anionic emulsifiers such as alkali metal salts or ammonium salts of alkanecarboxylic acids, alkanesulfonic acids and sulfo acids of alkoxylated alkanols, polyols, phenols and alkylphenols;

wetting agents such as siloxanes, fluorine compounds, carboxylic monoesters, phosphates, polyacrylic acids and their copolymers, or polyurethanes;

adhesion promoters such as tricyclodecanedimethanol;

leveling agents;

film-forming auxiliaries such as cellulose derivatives;

transparent fillers based on titanium dioxide, silica, alumina or zirconium oxide; for further details reference is made to Römpp Lexikon Lacke und Druckfarben, Georg Thieme Verlag, Stuttgart, 1998, pages 250 to 252;

rheology control additives, such as those known from patents WO 94/22968, EP 0 276 501 A1, EP 0 249 201 A1 or WO 97/12945; crosslinked polymeric microparticles, as disclosed for example in EP 0 008 127 A1; inorganic phyllosilicates, preferably smectites, especially montmorillonites and hectorites, such as aluminum-magnesium silicates, sodium-magnesium and sodium-magnesium-fluorine-lithium phyllosilicates of the montmorillonite type or inorganic phyllosilicates such as aluminum-magnesium silicates, sodium-magnesium and sodium-magnesium-fluorine-lithium phyllosilicates of the montmorillonite type (for further details reference is made to the book by Johan Bieleman, "Lackadditive", Wiley-VCH, Weinheim, N.Y., 1998, pages 17 to 30); silicas such as Aerosils; or synthetic polymers containing ionic and/or associative groups such as polyvinyl alcohol, poly(meth)acrylamide, poly(meth)acrylic acid, polyvinylpyrrolidone, styrene-maleic anhydride or ethylene-maleic anhydride copolymers and their derivatives or hydrophobically modified polyacrylates; or associative thickeners based on polyurethane, as described in Römpp Lexikon Lacke und Druckfarben, Georg Thieme Verlag, Stuttgart, N.Y., 1998, "Thickeners", pages 599 to 600, and in the textbook "Lackadditive" by Johan Bieleman, Wiley-VCH, Weinheim, N.Y., 1998, panes 51 to 59 and 65; and/or flame retardants.

Further examples of suitable coatings additives are described in the textbook "Lackadditive" by Johan Bieleman, Wiley-VCH, Weinheim, N.Y., 1998.

The aqueous basecoats of the invention preferably have spray viscosity and a solids content of from 5.0 to 60, more preferably from 10 to 60, with particular preference from 13 to 60, and in particular from 13 to 55% by weight, based in each case on the overall weight of the respective aqueous basecoat of the invention.

The preparation of the aqueous basecoat of the invention has no special features but instead takes place in a customary and known manner by mixing of the above-described constituents in appropriate mixing equipment such as stirred vessels, dissolvers, stirred mills or extruders in accordance with the techniques suitable for preparing the respective aqueous basecoats.

The aqueous basecoat of the invention is used to produce the coatings of the invention, especially multicoat coating systems, on primed or unprimed substrates.

Suitable substrates are all surfaces for coating which are not damaged by curing of the coatings present thereon using heat, or heat and actinic radiation. Suitable substrates comprise, for example, metals, plastics wood, ceramic, stone, textile, fiber assemblies, leather, glass, glass fibers, glass wool and rock wool, mineral-bound and resin-bound building materials, such as plasterboards and cement boards or roof tiles, and composites of these materials. Accordingly, the aqueous basecoat of the invention is suitable for applications outside that of vehicle finishing as well. In this context it is particularly suitable for the coating of furniture and for industrial coating, including coil coating, container coating, and the impregnation or coating of electrical components. In the context of industrial coatings it is suitable for coating virtually all parts for domestic or industrial use, such as radiators, domestic appliances, small metal parts such as screws and nuts, wheel caps, wheel rims, packaging, or electrical components such as motor windings or transformer windings.

The comments made above also apply, mutatis mutandis, to the surfacers, solid-color topcoats, and clearcoats of the invention, and to the adhesives and sealing compounds of the invention.

In the case of electrically conductive substrates it is possible to use primers, which are prepared in a customary and known manner from electrodeposition coating materials. Both anodic and cathodic electrodeposition coating materials are suitable for this purpose, but especially cathodics.

With the multicoat coating system of the invention it is also possible to coat primed or unprimed plastics such as, for example, ABS, AMMA, ASA, CA, CAB, EP, UF, CF, MF, MPF, PF, PAN, PA, PE, HDPE, LDPE, LLDPE, UHMWPE, PET, PMMA, PP, PS, SB, PUR, PVC, RF, SAN, PBT, PPE, POM, PUR-RIM, SMC, BMC, PP-EPDM and UP (abbreviations to DIN 7728P1) and also polymer blends thereof or the fiber-reinforced composite materials produced using these plastics.

In the case of unfunctionalized and/or apolar substrate surfaces, these may be subjected prior to coating in a known manner to a pretreatment, such as with a plasma or by flaming, or may be provided with an aqueous primer.

The multicoat coating systems of the invention may be produced in a variety of ways in accordance with the invention.

A first preferred variant of the process of the invention comprises the following process steps:

(I) preparing a basecoat film by applying the aqueous basecoat of the invention to the substrate, (II) drying the basecoat film, (III) preparing a clearcoat film by applying a clearcoat material to the basecoat film, and (IV) jointly curing the basecoat film and the clearcoat film, to give the basecoat and the clearcoat (wet-on-wet technique).

This variant offers particular advantages especially in the context of the coating of plastics, and is therefore employed with particular preference in that utility.

A second preferred variant of the process of the invention comprises the following steps:

(I) preparing a surfacer film by applying a surfacer to the substrate, (II) curing the surfacer film, to give the surfacer coat, (III) preparing a basecoat film by applying the aqueous basecoat of the invention to the surfacer coat, (IV) drying the basecoat film, (V) preparing a clearcoat film by applying a clearcoat material to the basecoat film, and (VI) jointly curing the basecoat film and the clearcoat film, to give the basecoat and the clearcoat (wet-on-wet technique).

A third preferred variant of the process of the invention comprises the following steps:

(I) preparing a surfacer film by applying a surfacer to the substrate, (II) drying the surfacer film, (III) preparing a basecoat film by applying the aqueous basecoat of the invention to the surfacer film, (IV) drying the basecoat film, (V) preparing a clearcoat film by applying a clearcoat material to the basecoat film, and (VI) jointly curing the surfacer film, the basecoat film and the clearcoat film, to give the surfacer, the basecoat and the clearcoat (extended wet-on-wet technique).

A fourth preferred variant of the process of the invention comprises the following steps:

(I) depositing an electrodeposition coating film on the substrate, (II) drying the electrodeposition coating film, (II) preparing a first basecoat film by applying a first basecoat material to the electrodeposition coating film, (III) jointly curing the electrodeposition coating film and the first basecoat film, to give the electrodeposition coating and the first basecoat (wet-on-wet technique), (IV) preparing a second basecoat film by applying a second basecoat material to the first basecoat, (V) drying the second basecoat film, (VI) preparing a clearcoat film by applying a clearcoat material to the basecoat film, and (VII) jointly curing the second basecoat film and clearcoat film, to give the second basecoat and the clearcoat (wet-on-wet technique).

The three last-mentioned variants offer particular advantages especially in the context of the coating of automobile bodies and are therefore employed with very particular preference in that utility.

It is a further particular advantage of the aqueous basecoat of the invention and of the processes of the invention that the aqueous basecoat may be combined not only with the surfacer of the invention but also with all customary and known surfacers.

Yet another special advantage of the aqueous basecoat of the invention and of the process of the invention proves to be that the aqueuos basecoat may be combined not only, outstandingly, with the clearcoat material of the invention but also with all customary and known clearcoat materials.

Clearcoat materials which are known per se are one-component or multicomponent clearcoats, powder clearcoats, powder slurry clearcoats, UV-curable clearcoats, or sealers, as known from the patent applications, patents and publications DE 42 04 518 A1, EP 0 594 068 A1, EP 0 594 071 A1, EP 0 594 142 A1, EP 0 604 992 A1, EP 0 596 460 A1, WO 94/10211, WO 94/10212, WO 94/10213, WO 94/22969 or WO 92/22615, U.S. Pat. No. 5,474,811 A1, U.S. Pat. No. 5,356,669 A1 or U.S. Pat. No. 5,605,965 A1, DE 42 22 194 A1, in the product information from BASF Lacke+Farben AG entitled "Pulverlacke" [Powder coatings], 1990, in the BASF Coatings AG company brochure "Pulverlacke, Pulverlacke fur industrielle Anwendungen" [Powder coating materials, powder coatings for industrial applications], January 2000,

| U.S. Pat. No. 4,268,542 A1, | DE 195 40 977 A1, | DE 195 18 392 A1, |
| DE 196 17 086 A1, | DE-A-196 13 547, | DE 196 52 813 A1, |
| DE-A-198 14 471 A1, | EP 0 928 800 A1, | EP 0 636 669 A1, |
| EP 0 410 242 A1, | EP 0 783 534 A1, | EP 0 650 978 A1, |
| EP 0 650 979 A1, | EP 0 650 985 A1, | EP 0 540 884 A1, |
| EP 0 568 967 A1, | EP 0 054 505 A1, | EP 0 002 866 A1, |
| DE 197 09 467 A1, | DE 42 03 278 A1, | DE 33 16 593 A1, |
| DE 38 36 370 A1, | DE 24 36 186 A1, | DE 20 03 579 B1, |
| WO 97/46549, | WO 99/14254, | U.S. Pat. No. 5,824,373 A1, |
| U.S. Pat. No. 4,675,234 A1, | U.S. Pat. No. 4,634,602 A1, | U.S. Pat. No. 4,424,252 A1, |
| U.S. Pat. No. 4,208,313 A1, | U.S. Pat. No. 4,163,810 A1, | U.S. Pat. No. 4,129,488 A1, |
| U.S. Pat. No. 4,064,161 A1, | U.S. Pat. No. 3,974,303 A1, | EP 0 844 286 A1, |
| DE 43 03 570 A1, | DE 34 07 087 A1, | DE 40 11 045 A1, |
| DE 40 25 215 A1, | DE 38 28 098 A1, | DE 40 20 316 A1 or |
| DE 41 22 743 A1. | | |

Powder slurry clearcoats offer particular advantages for the multicoat color and/or effect coating system of the invention and are therefore used with particular preference in accordance with the invention.

Furthermore, the clearcoats may additionally be coated further with at least one other clearcoat, for example, an organically modified ceramic layer, thereby making it possible to improve significantly the scratch resistance of the multicoat coating system of the invention.

The aqueous basecoat of the invention may be applied by all customary application methods, such as spraying, knifecoating, brushing, flowcoating, dipping, impregnating, trickling, or rolling, for example. The substrate to be coated may itself be at rest, with the application equipment or unit being moved. Alternatively, the substrate to be coated, especially a coil, may be moved, with the application unit being at rest relative to the substrate or being moved appropriately.

Preference is given to the use of spray application methods, such as compressed-air spraying, airless spraying, high-speed rotation, electrostatic spray application (ESTA), alone or in conjunction with hot spray applications such as hot-air spraying, for example. Application may be conducted at temperatures of max. 70 to 80° C., so that suitable application viscosities are achieved without the short-term thermal stress being accompanied by any change in or damage to the aqueous basecoat or its overspray, which may be intended for reprocessing. For instance, hot spraying may be configured such that the aqueous basecoat is heated in the spray nozzle for only a very short time, or is heated just a short way upstream of the spray nozzle.

The spray booth used for the application may be operated, for example, with an optionally temperature-controllable circulation, which is operated with an appropriate absorption medium for the overspray, an example being the aqueous basecoat itself.

In general, the surfacer coating film, basecoat film and clearcoat film are applied in a wet film thickness such that they cure to give coats having the coat thicknesses which are necessary and advantageous for their functions. In the case of the surfacer coat, this coat thickness is from 10 to 150, preferably from 10 to 120, with particular preference from 10 to 100, and in particular from 10 to 90 $\mu$m; in the case of the basecoat it is from 5 to 50, preferably from 5 to 40, with particular preference from 5 to 30, and in particular from 10 to 25 $\mu$m; and in the case of the clearcoats it is from 10 to 100, preferably from 15 to 80, with particular preference from 20 to 70, and in particular from 25 to 60 $\mu$m. It is also possible, however, to employ the multicoat system known from European Patent Application EP 0 817 614 A1, comprising an electrodeposition coat, a first basecoat, a second basecoat, and a clearcoat, in which the overall coat thickness of the first and second basecoats is from 15 to 40 $\mu$m and the coat thickness of the first basecoat is from 20 to 50% of said overall coat thickness.

The surfacer coating film, basecoat film and clearcoat film are cleared thermally, or thermally and with actinic radiation (dual cure).

Full curing may take place after a certain rest time. Its duration may be from 30 s to 2 h, preferably from 1 min to 1 h, and in particular from 1 min to 45 min. The rest time serves, for example, for the coating films to flow and undergo devolatilization, or for the evaporation of volatile constituents such as solvents. The rest time may be assisted and/or shortened by the application at elevated temperatures of up to 90° C. and/or by a reduced atmospheric humidity <10 g water/kg air, especially <5 g/kg air, provided this does not entail any damage or change to the coating films, such as premature complete crosslinking, for instance.

The thermal curing has no special features in terms of its method but instead takes place in accordance with the customary and known methods, such as heating in a convection oven or irradiation with IR lamps. This thermal curing may also take place in stages.

Advantageously, thermal curing takes place at a temperature of from 50 to 100° C., with particular preference from 60 to 100° C., and in particular from 80 to 100° C., for a time of from 1 min up to 2 h, with particular preference from 2 min up to 1 h, and in particular from 3 min to 45 min. This process is employed in particular in the case of two-component or multicomponent systems.

If one-component systems and substrates of high heat-resistance are used, thermal crosslinking may also be conducted at temperatures above 1000° C. In this case it is generally advisable not to exceed temperatures of 180° C., preferably 160° C., and in particular 155° C.

Curing with actinic radiation is preferably conducted with UV radiation and/or electron beams. It is preferred to employ a dose of from 1000 to 3000, preferably from 1100 to 2900, with particular preference from 1200 to 2800, with very particular preference from 1300 to 2700, and in particular from 1400 to 2600 mJ/cm$^2$. If desired, this curing may be supplemented by actinic radiation from other radiation sources. In the case of electron beams, it is preferred to operate under an inert gas atmosphere. This may be ensured, for example, by supplying carbon dioxide and/or nitrogen directly to the surface of the coating films. When curing with UV radiation, as well, it is also possible to operate under inert gas in order to prevent the formation of ozone.

For curing with actinic radiation, the customary and known radiation sources and optical auxiliary measures are employed. Examples of suitable radiation sources are flashlights from the company VISIT, high-pressure or low-pressure mercury vapor lamps, with or without lead doping in order to open up a radiation window of up to 405 nm, or electron beam sources. The arrangement of these sources is known in principle and may be adapted to the circumstances of the workpiece and the process parameters. In the case of workpieces of complex shape, as envisaged for automobile bodies, the regions not accessible to direct radiation (shadow regions) such as cavities, folds and other structural undercuts may be (partially) cured using point emitters, small surface area emitters or circular emitters, in combination with an automatic movement means for the irradiation of cavities or edges.

The apparatus and conditions for these curing methods are described, for example, in R. Holmes, U.V. and E.B. Curing Formulations for Printing Inks, Coatings and Paints, SITA Technology, Academic Press, London, United Kingdom 1984.

Curing may be carried out in stages, i.e., by means of multiple exposure to light or with actinic radiation. It may also be carried out alternatingly; ie., curing is conducted in alternation with UV radiation and electron beams.

If thermal curing and curing with actinic radiation are employed together, these methods may be used simultaneously or in alternation. If the two curing methods are used in alternation, it is possible, for example, to begin with thermal curing and to end with actinic radiation curing. In other cases it may prove advantageous to begin with curing with actinic radiation and to end with it. Particular advantages result if the aqueous basecoat film is cured in two separate process steps, first with actinic radiation and then thermally.

The application and curing techniques described above are also employed with the other coating films (surfacer films, solid-color topcoat films, clearcoat films) and also with the adhesives and sealing compounds of the invention.

The multicoat coating systems of the invention exhibit an outstanding profile of properties which is very well balanced in terms of mechanics, optics, corrosion resistance, and adhesion. Thus the multicoat coating systems of the invention possess the high optical quality and intercoat adhesion required by the market and do not give rise to any problems such as deficient condensation resistance, cracking (mudcracking) or leveling defects, or surface structures in the clearcoats.

In particular, the multicoat coating systems of the invention exhibit an outstanding metallic effect, an excellent D.O.I. (distinctness of the reflected image), and an outstanding surface smoothness. They are weathering-stable, resistant to chemicals and bird droppings, are scratch resistant, and exhibit very good reflow behavior.

Last but not least, however, it proves to be a very special advantage that through the use of the aqueous basecoats of the invention in the production of the multicoat coatings of the invention no cracking or popping marks result even when the aqueous basecoat films are overcoated with powder slurry clearcoats and subsequently baked together with them. By this means it is possible to combine the particular advantages of aqueous basecoats with the particular advantages of powder slurry clearcoats. Moreover, these very multicoat coating systems of the invention prove to be particularly firmly adhering, even when used as refinishes.

The adhesives and sealing compounds of the invention are outstandingly suitable for the production of adhesive films and seals, which retain particularly high bond strength and particularly high sealing capacity even under extreme and/or rapidly changing climatic conditions.

Accordingly, the primed or unprimed substrates of the invention coated with at least one coating of the invention, bonded with at least one adhesive film of the invention, and/or sealed with at least one seal of the invention, combine a particularly advantageous profile of performance properties with a particularly long service life, so making them particularly valuable economically.

EXAMPLES AND COMPARATIVE EXPERIMENTS

Example 1

The Preparation of an Inventive Polyurethane

In a reaction vessel equipped with stirrer, internal thermometer, reflux condenser and electrical heating, 701 parts by weight of a linear polyester polyol (prepared from dimerized fatty acid (Pripol® 1013), isophthalic acid and 1,6-hexanediol) having a hydroxyl number of 80 and a number-average molecular weight of 1400 daltons, 41.5 parts by weight of vinylcyclohexanediol and 99.7 parts by weight of dimethylolpropionic acid were dissolved in 404 parts by weight of methyl ethyl ketone and 123 parts by weight of N-methylpyrrolidone. 388.8 parts by weight of isophorone diisocyanate were added to the resulting solution at 45° C. After the exothermic reaction had subsided, the reaction mixture was slowly heated to 80° C. with stirring. It was stirred further at this temperature until the isocyanate content remained constant at 1.1% by weight. The reaction mixture was then cooled to 60° C. and 36.7 parts by weight of diethanolamine were added. The resulting reaction mixture was stirred at 60° C. until free isocyanate groups were no longer detectable. The resulting dissolved polyurethane was admixed with 137 parts by weight of methoxypropanol and 55 parts by weight of triethylamine. 30 minutes after adding the amine, 1500 parts by weight of deionized water were added with stirring over the course of 30 minutes. The methyl ethyl ketone was removed from the resulting dispersion by distillation under reduced pressure at 60° C. Thereafter, any losses of solvent and of water were compensated. The resultant dispersion of the polyurethane of the invention was adjusted to a solids content of 35.1% by weight (one hour at 130° C.) and a pH of 7.3.

Example 2

The Preparation of an Inventive Primary Dispersion of a Graft Copolymer 1487.2 parts by weight of the polyurethane dispersion from Example 1 were diluted with 864.4 parts by weight of deionized water and heated to 85° C. At this temperature, a mixture of 150.2 parts by weight of styrene, 150.2 parts by weight of methyl methacrylate, 112.4 parts by weight of n-butyl acrylate and 112.4 parts by weight of hydroxyethyl methacrylate were added to the dispersion at a uniform rate over the course of 3.5 hours with stirring. At the same time as commencing the addition of the monomer mixture, a solution of 7.9 parts by weight of tert-butyl peroxyethylhexanoate in 115.5 parts by weight of methoxypropanol was added over the course of four hours. The weight ratio of polyurethane to monomers was 1:1. The resulting reaction mixture was stirred at 85° C. until all of the monomers had reacted. The resulting primary dispersion of the graft copolymer had a very good storage stability. Its solid content was 35.7% by weight (one hour at 130° C.) and its pH was 7.2.

Comparative Experiment C1

The Preparation of a Known Polyurethane Containing Lateral Vinyl Groups

A hydroxyl-containing polyester was prepared in accordance with patent EP 0 608 021 A1, page 6 lines 22 to 37 (intermediate A). For this purpose, a mixture of 236 parts by weight of 1,6-hexanediol, 208 parts by weight of neopentyl glycol, 616 parts by weight of hexahydrophthalic anhydride and 6 parts by weight of benzyltriphenylphosphonium chloride was charged to an appropriate reaction vessel and heated to 120° C. under nitrogen and with stirring. After one hour at this temperature, the reaction mixture was heated to 140° C. Subsequently, 1000 parts by weight of the glycidyl ester of 1,1-dimethyl-1-heptanecarboxylic acid (Cardura® E-10 from Shell) were metered in over two hours. After four hours, the reaction mixture had an acid number of 8.5 mg KOH/g. A further 80 parts by weight of Cardura® E-10 were added. After another two hours, the acid number of the reaction mixture was less than 1 mg KOH/g.

In accordance with the instructions given on page 7 lines 1 to 27 (Example I) of patent EP 0 608 021 A1, 261.6 parts by weight of the above-described polyester, 55 parts by weight of N-methylpyrrolidone and 0.1 part by weight of dibutyltin diacetate were taken as initial charge. 72.1 parts by weight of isophorone diisocyanate were metered into this mixture over the course of one hour at 90° C. After two hours at 90° C., the reaction mixture was heated to 100° C. At this temperature, 16.3 parts by weight of 1-(1-isocyanato-1-methylethyl)-3-(1-methyle (TMI® from Cytec) were metered in over 15 minutes. The resulting reaction mixture was held at 100° C. for one hour.

Thereafter, the reaction mixture was heated to 130° C. and at this temperature a mixture of 38.2 parts by weight of styrene, 9.2 parts by weight of methyl methacrylate, 33.1 parts by weight of acrylic acid, 66 parts by weight of Cardura® E-10, 2.7 parts by weight of dicumyl peroxide, 0.8 part by weight of 3-mercaptopropionic acid and 51.9 parts by weight of 2-butoxyethanol was added over the course of one hour under nitrogen and with stirring. The resulting reaction mixture was held at this temperature for three hours. Subsequently, at 115° C., 18.1 parts by weight of dimethylethanolamine were metered in. After the mixture had cooled to 90° C., 782 parts by weight of deionized water were metered in dropwise with stirring over three hours, giving a secondary dispersion having a solids content of 35.8% by weight.

Example 3 and Comparative Experiments C2 and C3

The Preparation of an Inventive Aqueous Basecoat (Example 3) and Noninventive Aqueous Basecoats (Comparative Experiments C2 and C3)

For the inventive example 3, 9.5 parts by weight of deionized water were charged to a mixing vessel. With stirring, 10.5 parts by weight of an aqueous acrylate dispersion [component (i) in accordance with patent DE 197 36 535 A1; Acronal® 290 D from BASF Aktiengesellschaft], 13.5 parts by weight of the inventive primary dispersion of Example 2, 10.4 parts by weight of the thickener 1 (paste of a synthetic sodium magnesium phyllosilicate from Laporte, 3% in water), 8.0 parts by weight of deionized water, 0.28 part by weight of a 15% strength aqueous ammonia solution and 18.0 parts by weight of a thickener 2 (3% strength aqueous solution of a polyacrylic acid thickener from Allied Colloids) were added.

Subsequently, with stirring, 4.2 parts by weight of a pigment paste having a carbon black content of 10% by weight and containing 60% by weight of the acrylated polyurethane dispersion in accordance with Example D of patent DE 44 37 535 A1, 10.2 parts by weight of a filler paste having an Aerosil content of 10% by weight and containing 50% by weight of the acrylated polyurethane dispersion in accordance with Example D of patent DE 44 37 535 A1, 2.0 parts by weight of butyl glycol and 3.5 parts by weight of a methanol- and butanol-etherified melamine resin from CYTEC were added.

In a separate mixing vessel, a mixture of 0.4 part by weight of a commercial aluminum bronze (AluStapa Hydrolux® from Eckart, Al content 65% by weight) and 0.6 part by weight of butyl glycol was stirred together. This mixture was subsequently added in portions and with vigorous stirring to the other mixture.

In a further separate mixer, 1.3 parts by weight of a pearlescent pigment (Iriodin® 9103 Sterling Silber WR from Merck) and 2.3 parts by weight of butyl glycol were mixed. This mixture was subsequently added in portions, again with vigorous stirring, to the mixture described above.

Table 1 gives an overview of the composition of the inventive aqueous basecoat of Example 3.

For comparative experiment C2, Example 3 was repeated but replacing the inventive primary dispersion of Example 2 by the aqueous polyurethane resin dispersion of Example 1 of patent DE 43 39 870 A1 [component (ii)].

For comparative experiment C3, Example 3 was repeated but replacing the inventive primary dispersion of Example 2 by the known secondary dispersion of comparative experiment C1. The material composition of the noninventive aqueous basecoats C3 and C2 is likewise given in Table 1.

TABLE 1

The composition of the inventive aqueous basecoat (Example 3) and of the noninventive aqueous basecoats (comparative experiments C2 and C3)

| Constituents | Comparative experiments: C2 | C3 | Example: 3 |
| --- | --- | --- | --- |
| Deionized water | 9.5 | 9.5 | 9.5 |
| Component (i) | 10.5 | 10.5 | 10.5 |
| Component (ii) | 13.5 | — | — |
| Secondary dispersion C1 | — | 13.5 | — |
| Primary dispersion (Ex. 2) | — | — | 13.5 |
| Thickener 1 | 10.4 | 10.4 | 10.4 |
| Deionized water | 8.0 | 8.0 | 8.0 |
| Ammonia solution | 0.28 | 0.28 | 0.28 |
| Thickener 2 | 18.0 | 18.0 | 18.0 |
| Pigment paste | 4.2 | 4.2 | 4.2 |
| Filler paste | 10.2 | 10.2 | 10.2 |
| Butyl glycol | 2.0 | 2.0 | 2.0 |
| Melamine resin | 3.5 | 3.5 | 3.5 |
| Aluminum paste | 0.4 | 0.4 | 0.4 |
| Butyl glycol | 0.6 | 0.6 | 0.6 |
| Iriodin 9103 | 1.3 | 1.3 | 1.3 |
| Butyl glycol | 2.3 | 2.3 | 2.3 |

The viscosity of the aqueous basecoats of Table 1 was adjusted using deionized water to from 90 to 95 mPas at a shear rate of 1000/s.

Example 4 and Comparative Experiments C4 and C5

The Preparation of an Inventive Multicoat System (Example 4) and of Noninventive Multicoat Systems (Comparative Experiments C4 and C5)

The inventive multicoat system of Example 4 was prepared using the inventive aqueous basecoat of Example 3 (cf. Table 1).

The noninventive multicoat system of comparative experiment C4 was prepared using the noninventive aqueous basecoat of comparative experiment C2 (cf. Table 1).

The noninventive multicoat system of comparative experiment C5 was prepared using the noninventive aqueous basecoat of comparative experiment C3 (cf. Table 1).

A. The Preparation of the Test Panels:

For example 4 and the Comparative experiments C4 and C5, test panels were first of all prepared. This was done by coating steel panels (bodywork panels), which had been coated with a customary and known cathodically deposited and baked electrodeposition coating, with a commercial thin-film surfacer (Ecoprime® 60 from BASF Coatings AG; anthracite-colored), after which the resulting surfacer film was flashed off at 20° C. and a relative atmospheric humidity of 65% for five minutes and dried at 80° C. in a convection oven for five minutes. Subsequently, the filler film had a dry film thickness of 15 µm.

Following the cooling of the test panels to 20° C., the aqueous basecoats of table 1 were applied, flashed off at 20° C. and a relative atmospheric humidity of 65% for five minutes and dried at 80° C. in a convection oven for five minutes, so that the dried basecoat films had a dry film thickness of approximately 15 µm.

After the test panels had again been cooled to 20° C., the basecoat films were overcoated with a powder slurry clearcoat material in accordance with International Patent Application WO 96/32452. The resulting powder slurry clearcoat films were flashed off at 20° C. and a relative atmospheric humidity of 65% for 3 minutes, and dried at 55° C. in a convection oven for five minutes. The dry film thickness of the resulting clearcoat films was from 50 to 60 µm.

Following the application of all three films, they were baked jointly at 155° C. for 30 minutes, to give the inventive multicoat system of Example 4 and the noninventive multicoat systems of the comparative experiments C4 and C5.

B. The Production of Refinish Coats:

To simulate the refinishing of the entire body on the line (line refinish), the test panels from Example 4 and from the comparative experiments C4 and C5 were sanded with a 1200 grit sandpaper and, in accordance with the instructions described above, were coated again with the same multicoat system in each case (double coating).

C. The Determination of the Popping Limit and Cracking Limit (Mudcracking):

In accordance with the instructions given in section A. above, multicoat systems were produced in which the basecoats were applied in a wedge from 3 to 40 μm. The clearcoats had a coat thickness of from 55 to 57 μm. The cracking limit and popping limit indicate the coat thickness above which surface defects (in this case popping marks and mudcracking) appear in the clearcoat. The cracking limit and the popping limit are a measure of the compatibility of the aqueous basecoat material with the clearcoat material, or of the basecoat with the clearcoat; the higher the cracking limit or the popping limit, the better the compatibility. The corresponding results are given in Table 2.

D. The Testing of the Clearcoat Adhesion:

The clearcoat adhesion was tested on unstressed test panels [cf. section A. above (original finish) and section B. above (refinish)] after three days of storage at room temperature. For this purpose, using a knife or a pointed mandrel, the multicoat systems were scored down to the steel surface. The score marks were then subjected to a jet of water under high pressure for one minute (high-pressure cleaner from Karcher), the water pressure being 230 bar, the water temperature 20° C., and the distance of the rotating spray nozzle from the test panels 6 cm. Assessment was made visually: if the multicoat system showed no damage, it was assessed as being "satisfactory" (sat.). If delamination occurred, this was assessed as being "unsatisfactory" (unsat.). The results are likewise given in Table 2.

E. The Testing of the Intercoat Adhesion After Ball Shot Testing:

Ball shot testing was carried out in accordance with the DaimlerChrysler specification, which is general knowledge among those in the art. The corresponding results are likewise given in Table 2.

F. The Testing of the Intercoat Adhesion After Constant Humidity Climate Exposure to DIN 50017:

The test panels produced in accordance with the instructions indicated in section A. were subjected to the constant humidity climate of DIN 50017. Subsequently, after 0 and 2 hours of regeneration, the intercoat adhesion was determined using the cross-cut test in accordance with DIN EN ISO 2409. The results are likewise given in Table 2.

TABLE 2

The results of the tests of sections C. to F.

|  | Comparative experiments: | | Example: |
|---|---|---|---|
| Tests | C4 | C5 | 4 |
| Section C.: | | | |
| Cracking limit (μm): | 28 | 12 | 36 |
| Popping limit (μm) | 23 | 13 | 29 |
| Section D.: | | | |
| Water jet test: | unsat.[1] | unsat.[1] | sat. |

TABLE 2-continued

The results of the tests of sections C. to F.

|  | Comparative experiments: | | Example: |
|---|---|---|---|
| Tests | C4 | C5 | 4 |
| Section E.: | | | |
| Ball shot testing: | | | |
| Original finish | 6/0 | 12/0 | 6/0 |
| Refinish | 16/0 | 35/0 | 14/0 |
| Section F.: | | | |
| Cross-cut test: | | | |
| After 0 hours' regeneration | GT0 | GT3 | GT0 |
| After 2 hours' regeneration | GT0 | GT1-2 | GT0 |

[1]Extensive clearcoat delamination

The results of Table 2 demonstrate that the inventive aqueous basecoat of Example 3 and the inventive multicoat system of Example 4 were clearly superior to the noninventive aqueous basecoats of comparative experiments C2 and C3 and to the noninventive multicoat systems of comparative experiments C4 and C5 in terms of the compatibility of aqueous basecoat and powder slurry clearcoat and in terms of the intercoat adhesion. Furthermore, they underscore the incompatibility of the noninventive aqueous basecoat C3 with the powder slurry clearcoat and the very poor individual chip resistance of the noninventive multicoat system C5 produced using it.

What is claimed is:

1. A hydrophilic or hydrophobic polyurethane having at least one olefinically unsaturated group selected from the group consisting of pendant olefinically unsaturated groups, terminal olefinically unsaturated groups, and mixtures thereof, wherein the pendant olefinically unsaturated groups are selected from the group consisting of pendant olefinically unsaturated groups which are attached to a cycloaliphatic group which represents a link in the polymer main chain end pendant olefinically unsaturated groups which are present as a double bond in a cycloolefinic group which constitutes a link in the polymer main chain, and the terminal olefinically unsaturated groups are selected from the group consisting of terminal olefinically unsaturated groups which are attached to a cycloaliphatic group which forms an endgroup of the polymer main chain and terminal olefinically unsaturated groups which are present as a double bond in a cycloolefinic structure which forms an endgroup of the polymer main chain.

2. The polyurethane as claimed in claim 1, wherein the pendant or terminal olefinically unsaturated groups attached to the cycloaliphatic groups are selected from the group consisting of (meth)acrytate, ethacrylate, crotonate, cinnamate, vinyl ether, vinyl ester, vinyl, dicyclopentadienyl, norbormenyl, isoprenyl, isopropenyl, allyl, butenyl groups, dlcyclopentadienyl ether, norbormenyl ether, isoprenyl ether, isopropenyl ether, allyl ether, butenyl ether groups; dicyclopentadienyl ester, norbormenyl ester, isoprenyl ester, isopropenyl ester, allyl ester, butenyl ester groups, and mixtures thereof.

3. The polyurethane of claim 2, wherein the olefinically unsaturated groups are vinyl groups.

4. The polyurethane of claim 1, wherein
the cycloaliphatic groups are selected from the group consisting of cycloaliphatics having 4 to 12 carbon atoms in the molecule and
the cycloolefinic groups are selected from the group consisting of cycloolefins having 4 to 12 carbon atoms in the molecule.

5. The polyurethane of claim 4, wherein
the cycloaliphatic groups are selected from the group consisting of cyclobutene, cyclopentane, cyclohexane, cycloheptane, cyclooctane, norbornane, bicyclo[2.2.2]octante, decalin, hydroindane, dicylcopentene, tricyclodecane, and adamantine, and
the cycloolefinic groups are selected from the group consisting of cyclopentene, cyclohexene, cycloheptene, cyclooctene, norbornene, bicyclo[2.2.2]octane, and dicylclopentene.

6. The polyurethane of claim 1, made by reacting
(i) at least one polyurethane prepolymer having at least one free isocyanate group in the molecule with a member selected from the group consisting of
(ii) at least one cycloaliphatic having at least one olefinically unsaturated group and having at least two isocyanate-reactive groups in the molecule,
(iii) at least one cycloolefin having at least two isocyanate-reactive groups in the molecule, and mixtures thereof.

7. The polyurethane of claim 6, wherein the cycloaliphatics (II) and/or cycloolefins (III) contain two Isocyanate-reactive groups in the molecule.

8. The polyurethane of claim 6, wherein the isocyanate-reactive groups are selected from the group consisting of hydroxyl, thiol, primary amino groups, secondary amino groups, and mixtures thereof.

9. The polyurethane of claim 8, wherein the isocyanate-reactive groups are hydroxyl groups.

10. The polyurethane of claim 6, characterized in that the cycloaliphatics (ii) comprise an olefinically unsaturated group.

11. The polyurethane of claim 10, wherein the olefinically unsaturated groups are selected from the group consisting of (meth)acrylate, ethacrylate, crotonate, cinnamate, vinyl ether, vinyl ester, vinyl, dicyclopentadienyl, norbormenyl, isoprenyl, isopropenyl, allyl, butenyl groups, dicyclopentadienyl ether, norbormenyl ether, isoprenyl ether, isopropenyl ether, allyl ether or butenyl ether groups, dicyclopentadienyl ester, norbormenyl ester, isoprenyl ester, isopropenyl ester, allyl ester, butenyl ester groups, and mixtures thereof.

12. The polyurethane of claim 11, wherein the olefinically unsaturated groups are vinyl groups.

13. The polyurethane of claim 10, wherein
the cycloaliphatics (ii) are selected from, the group consisting of positionally isomeric vinyl-substituted polyhydroxy derivatives of cyclobutane, cyclopentane, cyclohexane, cycloheptane, cyclooctane, norbornane, bicyclo[2.2.2]octane, decalin, hydroindane, dicylcopentene, tricyclodecane, and adamantane and
the cycloolefins (iii) are selected from the group consisting of positionally isomeric polyhydroxy derivatives of cyclopentene, cyclohexene, cycloheptene, cyclooctene, norbornene, bicyclo[2.2.2]octane, and dicylclopentene.

14. The polyurethane of claim 13, wherein the cycloaliphatics (ii) or the cycloolefins (iii) are positionally isomeric dihydroxy derivatives.

15. The polyurethane of claim 14 wherein the positionally isomeric dihydroxy derivative is vinylcyclohexanediol.

16. The polyurethane of claim 6, wherein the polyurethane prepolymer is prepared from at least one diisocyanate and at least one compound having two isocyanate-reactive groups.

17. A graft copolymer prepared by (co)polymerizing at least one monomer (a) in the presence of at least one polyurethane of claim 1.

18. A method of making a sealing compound, adhesive, or coating material, comprising using at least one polyurethane of claim 1.

19. A sealing compound, adhesive, or coating material comprising at least one member selected from the group consisting of a polyurethane of claim 1, a graft copolymer of claim 17, or mixtures thereof.

20. A hydrophilic or hydrophobic polyurethane having at least one olefinically unsaturated group selected from the group consisting of pendant olefinically unsaturated groups, terminal olefinically unsaturated groups, and mixtures thereof, wherein
the pendant olefinically unsaturated groups are selected from the group consisting of pendant olefinically unsaturated groups which are attached to a cycloaliphatic group which represents a link in the polymer main chain and pendant olefinically unsaturated groups which are present as a double bond in a cycloolefinic group which constitutes a link in the polymer main chain, and
the terminal olefinically unsaturated groups are selected from the group consisting of terminal olefinically unsaturated groups which are attached to a cycloaliphatic group which forms an endgroup of the polymer main chain and terminal olefinically unsaturated groups which are present as a double bond in a cycloolefinic structure which forms an endgroup of the polymer main chain, the polyurethane made by reacting
(iv) at least one polyurethane prepolymer having at least one free isocyanate group in the molecule with a member selected from the group consisting of
(v) at least one cycloaliphatic having at least one olefinically unsaturated group and having at least two isocyanate-reactive groups in the molecule,
(vi) at least one cycloolefin having at least two isocyanate-reactive groups in the molecule, and mixtures thereof.

* * * * *